(12) United States Patent
Endo

(10) Patent No.: US 7,472,149 B2
(45) Date of Patent: Dec. 30, 2008

(54) ARITHMETIC UNIT FOR APPROXIMATING FUNCTION

(75) Inventor: Yukio Endo, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 601 days.

(21) Appl. No.: 10/924,981

(22) Filed: Aug. 25, 2004

(65) Prior Publication Data

US 2005/0160129 A1 Jul. 21, 2005

(30) Foreign Application Priority Data

Jan. 21, 2004 (JP) ............................. 2004-013545

(51) Int. Cl.
*G06F 1/02* (2006.01)

(52) U.S. Cl. .................................... 708/270

(58) Field of Classification Search ......... 708/270–277, 708/200
See application file for complete search history.

(56) References Cited

U.S. PATENT DOCUMENTS

| | | | | |
|---|---|---|---|---|
| 4,282,578 A | * | 8/1981 | Payne et al. ................. | 708/290 |
| 4,482,975 A | * | 11/1984 | King et al. .................. | 708/272 |
| 5,224,064 A | * | 6/1993 | Henry et al. ................ | 708/440 |
| 5,942,992 A | * | 8/1999 | Kelly ......................... | 708/501 |
| 6,049,343 A | * | 4/2000 | Abe et al. ................... | 708/204 |
| 6,240,433 B1 | * | 5/2001 | Schmookler et al. ........ | 708/270 |
| 6,256,653 B1 | | 7/2001 | Juffa et al. | |
| 6,549,924 B1 | | 4/2003 | Miller, Jr. | |
| 6,952,710 B2 | * | 10/2005 | Pelton et al. ................ | 708/502 |
| 6,976,043 B2 | * | 12/2005 | Clifton ....................... | 708/277 |
| 2003/0037080 A1 | * | 2/2003 | Clifton ....................... | 708/270 |

OTHER PUBLICATIONS

Andrew S. Noetzel, "An Interpolating Memory Unit for Function Evaluation: Analysis and Design", IEEE Transactions on Computers, vol. 38, No. 3, Mar. 1989, pp. 377-384.

\* cited by examiner

*Primary Examiner*—Chat C Do
(74) *Attorney, Agent, or Firm*—Oblon, Spivak, McClelland, Maier & Neustadt, P.C.

(57) ABSTRACT

A look-up table outputs an initial value, an inclination of a straight line and a correction value in response to an entry-of a high-order bit string of an operand. An offset circuit calculates an offset of the low-order bit string. A correction circuit outputs the initial value obtained by adding the correction value to at least one of the initial value and the inclination when the correction is necessary. A multiplier calculates a product of the inclination and the offset. An adder calculates the sum of the initial value and the product.

15 Claims, 17 Drawing Sheets

ARITHMETIC UNIT FOR APPROXIMATING FUNCTION

CROSS REFERENCE TO RELATED APPLICATIONS

This application is based upon and claims the benefit of priority from prior Japanese Patent Applications No. P2004-13545, filed on Jan. 21, 2004; the entire contents of which are incorporated herein by reference.

BACKGROUND OF THE INVENTION

1. Field of the Invention

The present invention relates to a function approximation arithmetic unit, which calculates function approximations using a look-up table (LUT).

2. Description of the Related Art

A calculation method using an arithmetic unit, which calculates function approximations using a conventional LUT, is described below. To begin with, an LUT is provided in advance. An operand is divided into a high-order bit string and a low-order bit string. An operand domain of a function is divided into multiple segments, which are associated with the high-order bit string. The function is approximated by a straight line having a reference value within a segment as an initial value. A LUT that outputs an initial value and the inclination value of a straight line in response to entry of the high-order bit string is prepared.

When an operand is input to an arithmetic unit, an initial value and the inclination value corresponding to a segment to which the input operand belongs are output from the LUT, and a straight line to approximate that segment to which the input operand belongs is determined. A function approximation is calculated by using that straight line and that operand.

An error between the function and the straight line tends to increase at the center and both ends of a segment. To reduce the error, the segment should be further subdivided. However, subdivision increases the number of segments, resulting in an increase in the number of bits of the high-order bit string. This increases the LUT size exponentially, resulting in an exponential increase in the circuit size of an arithmetic unit.

SUMMARY OF THE INVENTION

According to an aspect of the present invention, an arithmetic unit for approximating a function is provided. The arithmetic unit includes a look-up table configured to output an initial value, an inclination of a straight line and at least one of relative correction values for the initial value and the inclination in response to an entry of a high-order bit string, an operand being divided into the high-order bit string and a low-order bit string, a domain of the function of the operand being divided into a plurality of segments associated with the high-order bit string, the function being approximated by the straight line indicating a value equal to the initial value at a reference value in one of the segments; an offset circuit configured to calculate an offset of the low-order bit string from the reference value; a determination circuit configured to determine whether a correction of the straight line is necessary by using high-order bits in the low-order bit string; a correction circuit configured to output the initial value obtained by adding an absolute correction value based on the relative correction values to at least one of the initial value and the inclination or by subtracting the absolute correction value from at least one of the initial value and the inclination, when the correction is necessary; a multiplier configured to calculate a product of the inclination and the offset; and an adder configured to calculate the sum of the initial value and the product.

According to another aspect of the present invention, an arithmetic unit for approximating a function is provided. The arithmetic unit includes a look-up table configured to output an initial value, an inclination of a straight line and a relative correction value for the initial value in response to an entry of a high-order bit string, an operand being divided into the high-order bit string and a low-order bit string, a domain of the function of the operand being divided into a plurality of segments associated with the high-order bit string, the function being approximated by the straight line indicating a value equal to the initial value at a reference value in one of the segments; an offset circuit configured to calculate an offset of the low-order bit string from the reference value; a determination circuit configured to determine whether a correction of the straight line is necessary by using the high-order bits in the low-order bit string; a correction circuit configured to output the initial value obtained by adding an absolute correction value based on the relative correction values to the initial value or by subtracting the absolute correction value from the initial value, when the correction is necessary; a multiplier configured to calculate a product of the inclination and the offset; and an adder configured to calculate the sum of the initial value and the product.

According to still another aspect of the present invention, an arithmetic unit for approximating a function is provided. The arithmetic unit includes a look-up table configured to output an initial value, an inclination of a straight line and a correction value for the inclination in response to an entry of a high-order bit string, an operand being divided into the high-order bit string and a low-order bit string, a domain of the function of the operand being divided into a plurality of segments associated with the high-order bit string, the function being approximated by the straight line indicating a value equal to the initial value at a reference value in one of the segments; an offset circuit configured to calculate an offset of the low-order bit string from the reference value; a determination circuit configured to determine whether a correction of the straight line is necessary by using high-order bits in the low-order bit string; a correction circuit configured to output the inclination obtained by adding the correction value to the inclination or by subtracting the correction value from the inclination, when the correction is necessary; a multiplier calculating a product of the inclination and the offset; and an adder calculating the sum of the initial value and the product.

DETAILED DESCRIPTION OF THE INVENTION

Figure 1:
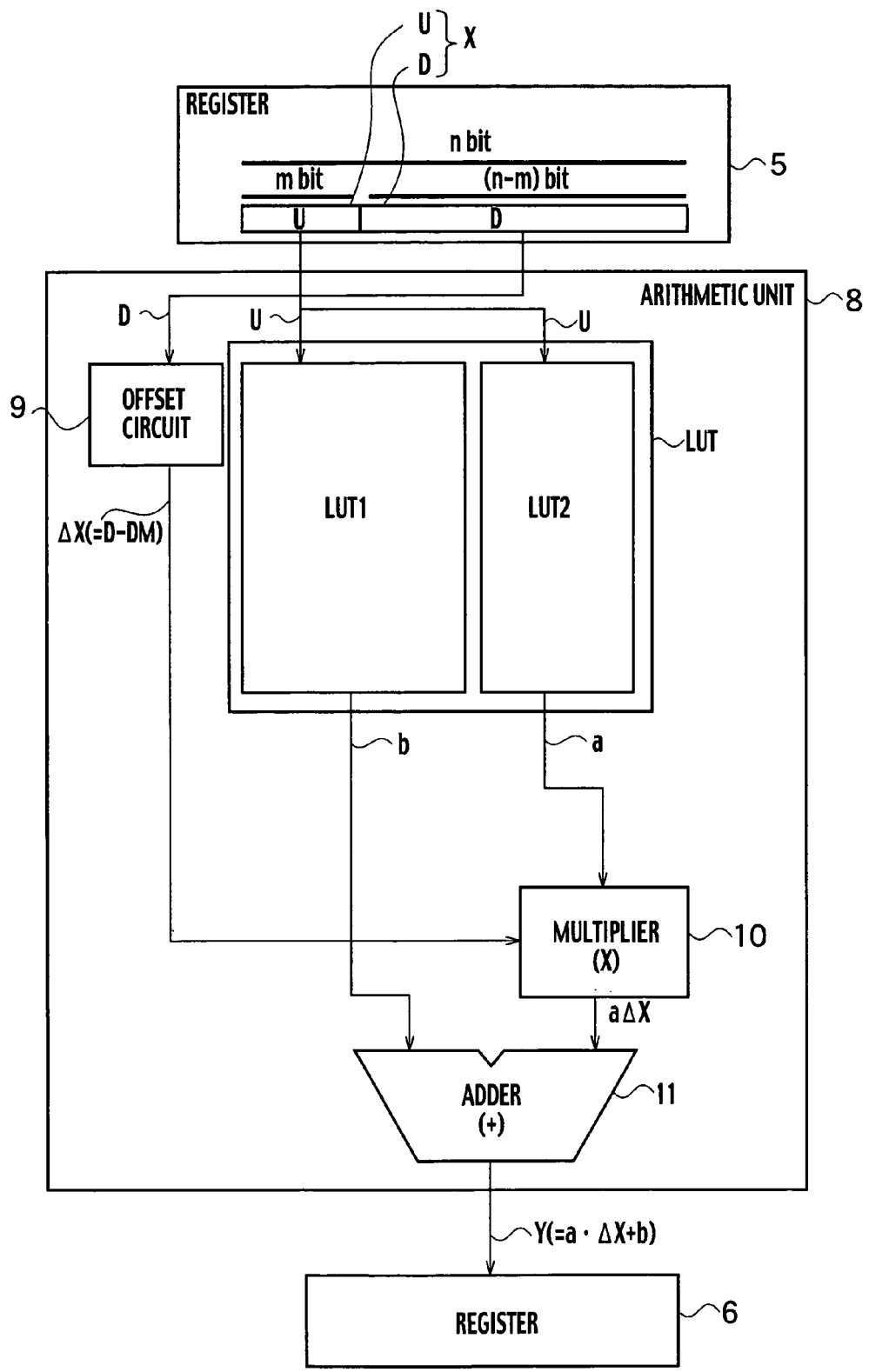
FIG. 1 is a block diagram of an arithmetic unit of a comparative example.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

COMPARATIVE EXAMPLE

Figure 2:
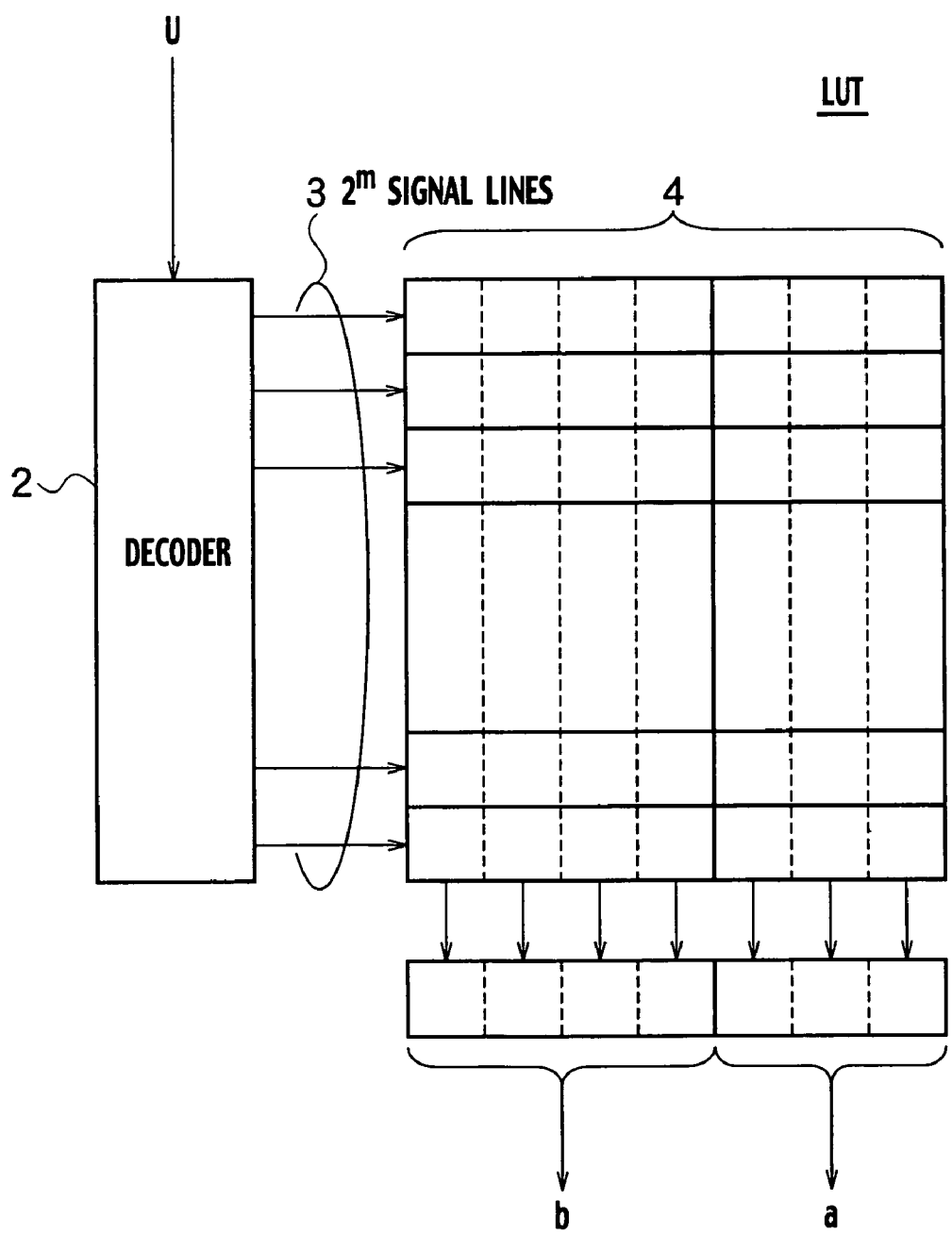
FIG. 2 is a block diagram of an LUT0 in the arithmetic unit of the comparative example.

As shown in FIG. 1, a function approximation arithmetic unit 8 of a comparative example includes an LUT, an offset circuit 9, a multiplier 10, and an adder 11. The LUT includes an LUT1 and an LUT2. As shown in FIG. 2, the LUT includes a decoder 2, signal lines 3, and a memory cell array 4.

Figure 3:
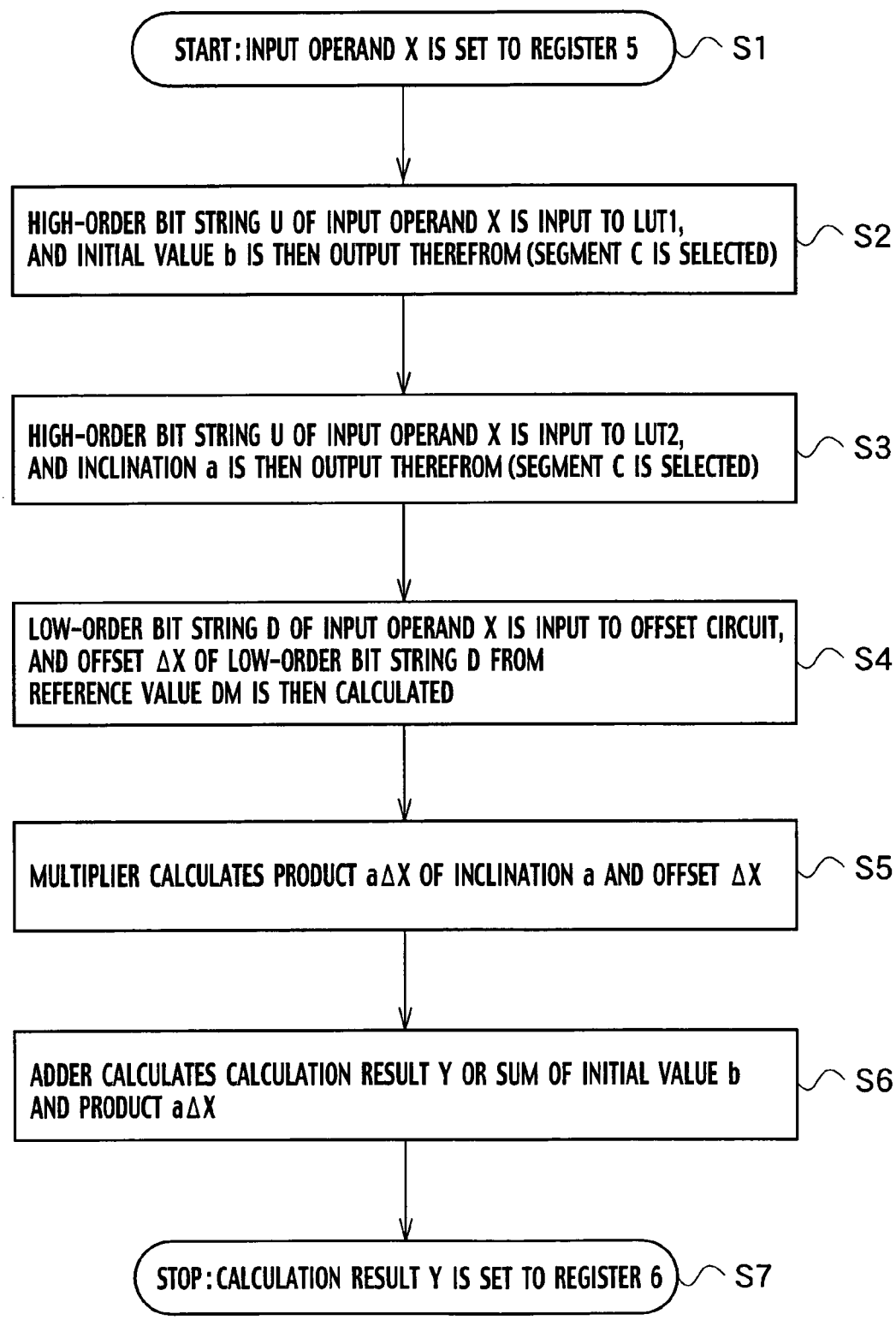
FIG. 3 is a flowchart for a calculation method for the arithmetic unit of the comparative example.
Figure 4:
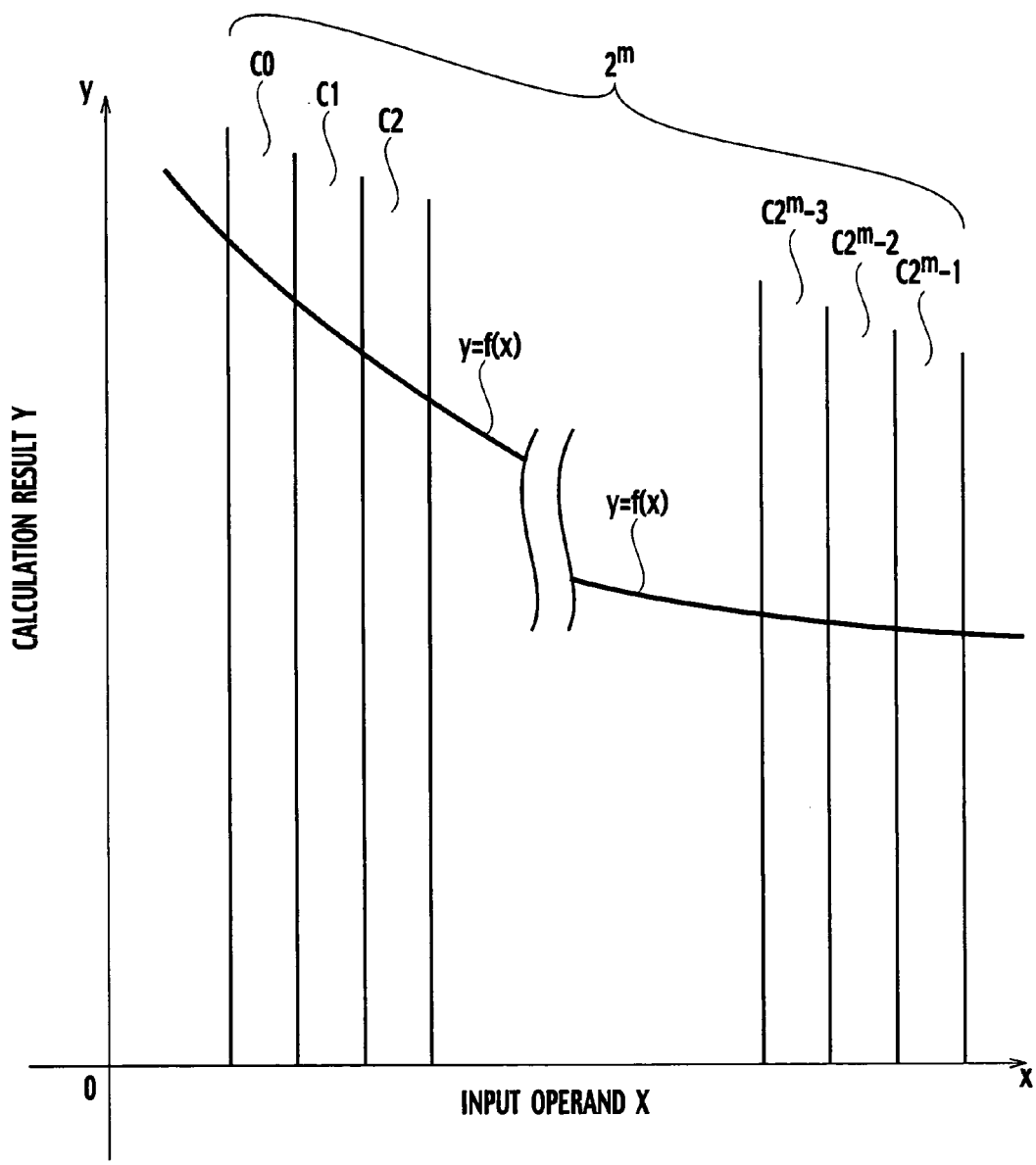
FIGS. 4 and 5 are graphs showing the relationship between input operands and corresponding calculation results.
Figure 5:
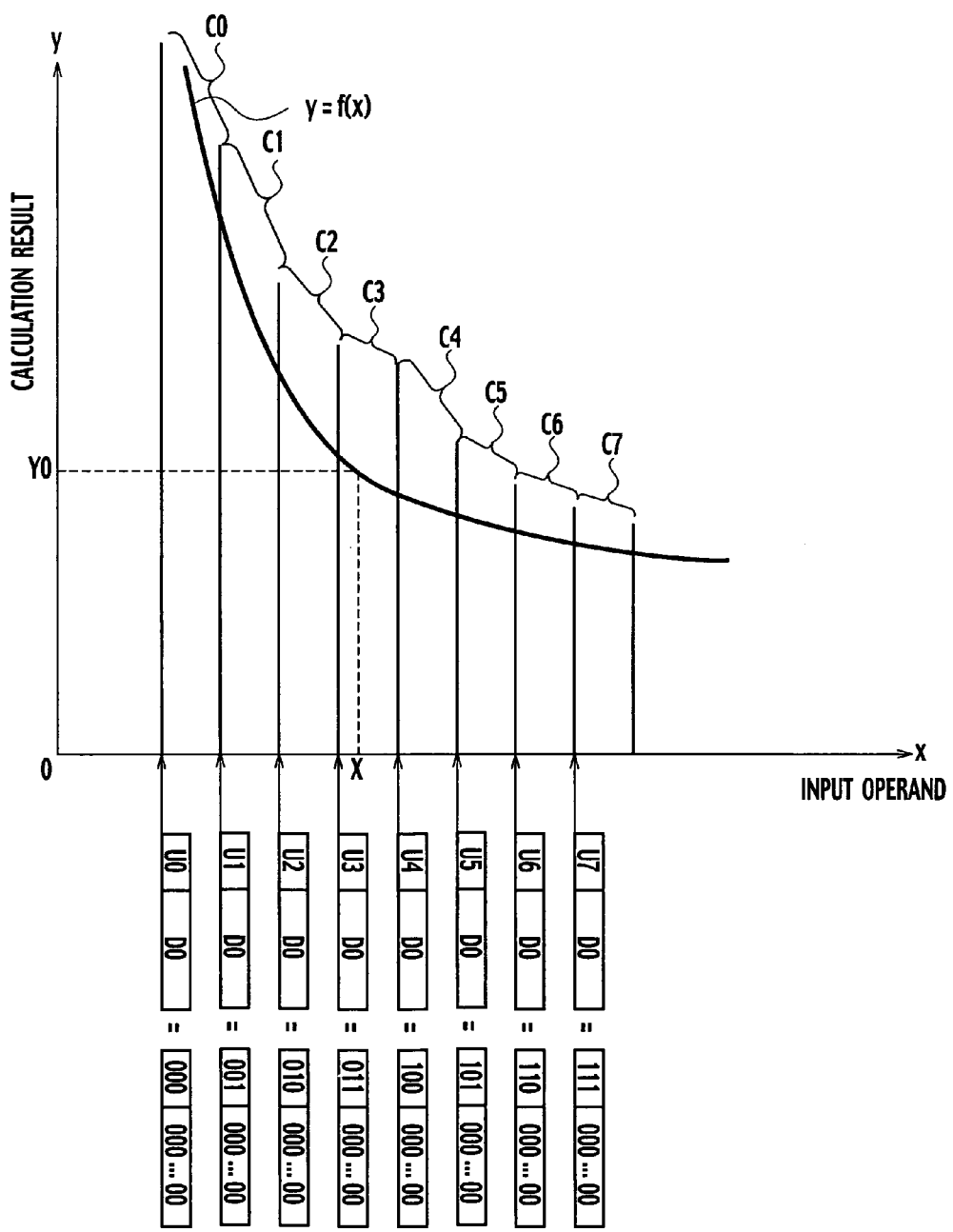

As shown in FIG. 3, in step S1, an external register 5 of the arithmetic unit 8 receives an n-bit binary operand X. The operand X is divided into a high-order m-bit string U and a low-order (n-m)-bit string D. As shown in FIG. 4, a domain of the operand X of the function $y=f(x)$ is divided into multiple segments C, which are associated with the high-order bit string U. The domain can be divided by the high-order m-bit string U into $2^m$ segments C0 to $C2^{m-1}$. A function is approximated by a straight line for each of segments C0 to $C2^{m-1}$. A case where m=3 is described forthwith for facilitating comprehension. As shown in FIG. 5, the LUT1 stores the values of the straight lines as initial values b0 to b7 for the respective high-order bit strings U0 to U7 corresponding to the segments C0 to C7 when the low-order bit string D of the operand X is the reference value DM. Similarly, the LUT2 stores the inclinations of straight lines a0 to a7 for the respective high-order bit strings U0 to U7 corresponding to the segments C0 to C7.

In step S2 of FIG. 3, the high-order bit string U is input to the LUT1, and the initial value b is output therefrom. In step S3, the high-order bit string U is input to the LUT2, and the inclination a is output therefrom.

In step S4, the offset circuit 9 calculates an offset ΔX or the difference between the reference value DM and the low-order bit string D of the operand X. In other words, the offset ΔX is the difference between the operand X and a reference point.

In step S5, the multiplier 10 calculates product aΔX of the offset ΔX and the inclination a.

In step S6, the adder 11 provides the calculation result Y or the sum of the product aΔX and the initial value b, and outputs the result to the register 6. In step S7, the calculation result Y is set to the register 6.

Next, a working example of the comparative example is described. As shown in FIG. 5, there is a one-to-one correspondence between the high-order bit strings U0 to U7 and the respective segments C0 to C7. The same low-order bit string D as D0 is arranged in the same order within the segments C0 to C7. Therefore, it is apparent that the high-order bit string U indicates one of the segments C0 to C7 to which the operand X belongs, and that the operand X belongs to the segment C3. In addition, when substituting the operand X for the function $y=f(x)$, it is understood that there is an exact solution Y0.

Figure 6:
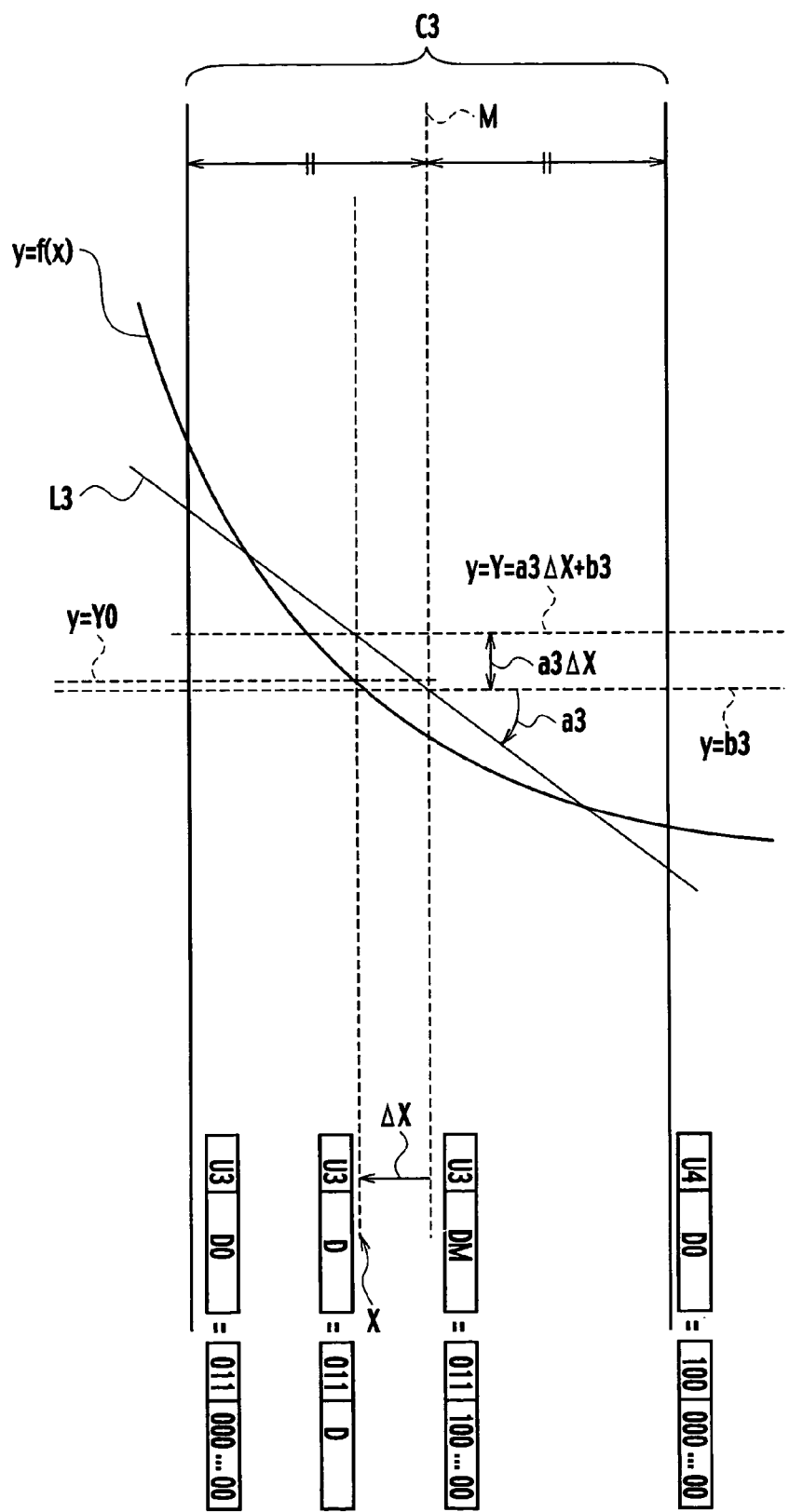
FIG. 6 is a graph showing the relationship between input operands X and corresponding calculation results Y using the calculation method for the arithmetic unit of the comparative example.

The low-order bit string D indicates a position in the segments C0 to C7 to which the operand X belongs. As shown in FIG. 6, only the segment C3 to which the operand X belongs should be considered for calculation result Y.

A certain point within each of the segments C0 to C7, for example, the midpoint M is selected as the reference value DM.

In step S2, the high-order bit string U3 of the operand X is input to the LUT1, and an initial value b3 is output therefrom.

In step S3, the high-order bit string U3 is input to the LUT2, and an inclination a3 is then output therefrom. A straight line represented by the initial value b3 and the inclination a3 is the straight line L3.

In step S4, the offset ΔX or the difference between the reference value DM and the low-order bit string D of the operand X is calculated.

In step S5, the product a3ΔX of the offset ΔX and the inclination a3 is calculated.

In step S6, the calculation result Y (=a3ΔX+b3) or the sum of the product a3ΔX and the initial value b3 is calculated, and the result is then output to the register 6.

First Embodiment

Figure 7:
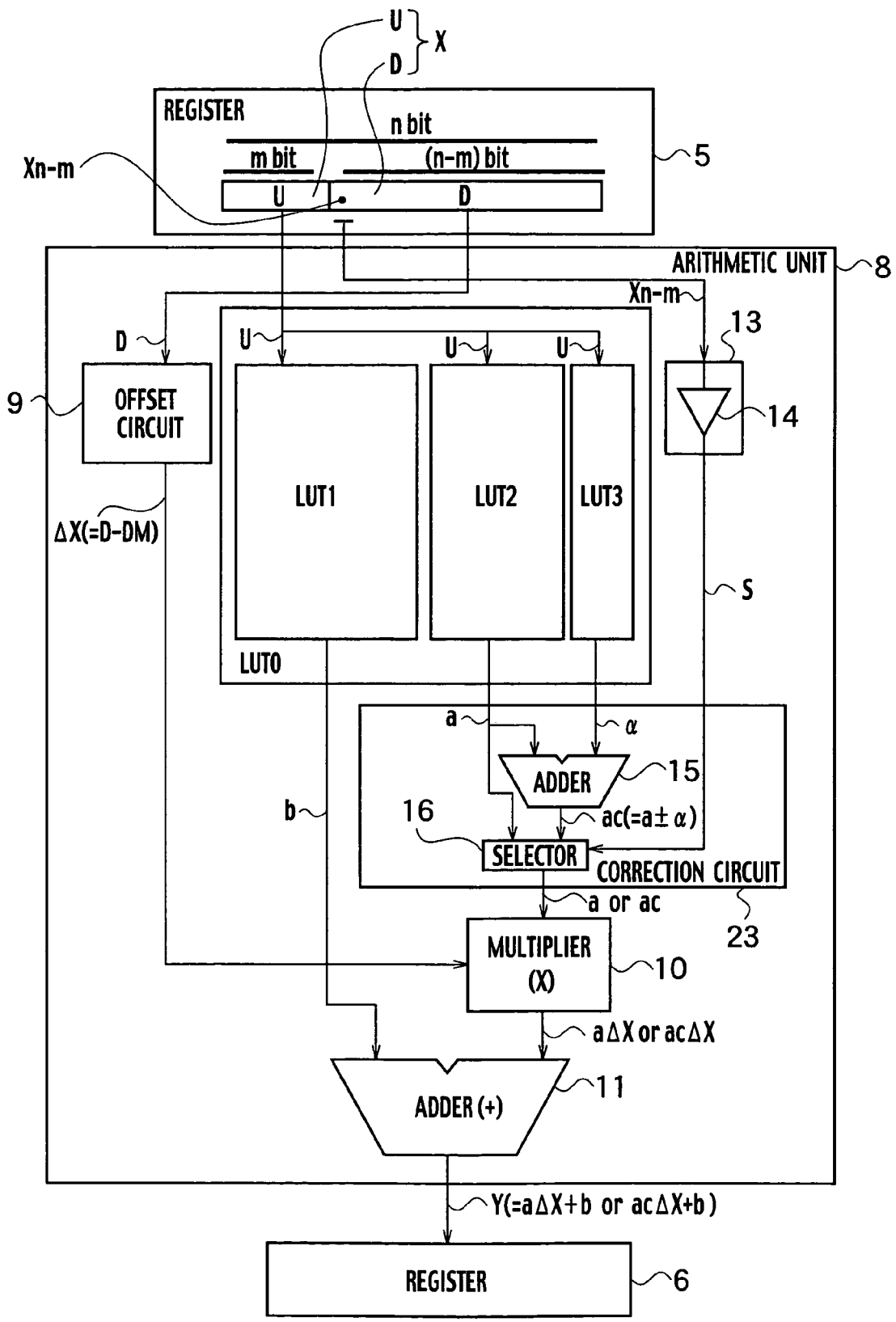
FIG. 7 is a block diagram of an arithmetic unit according to a first embodiment.
Figure 8:
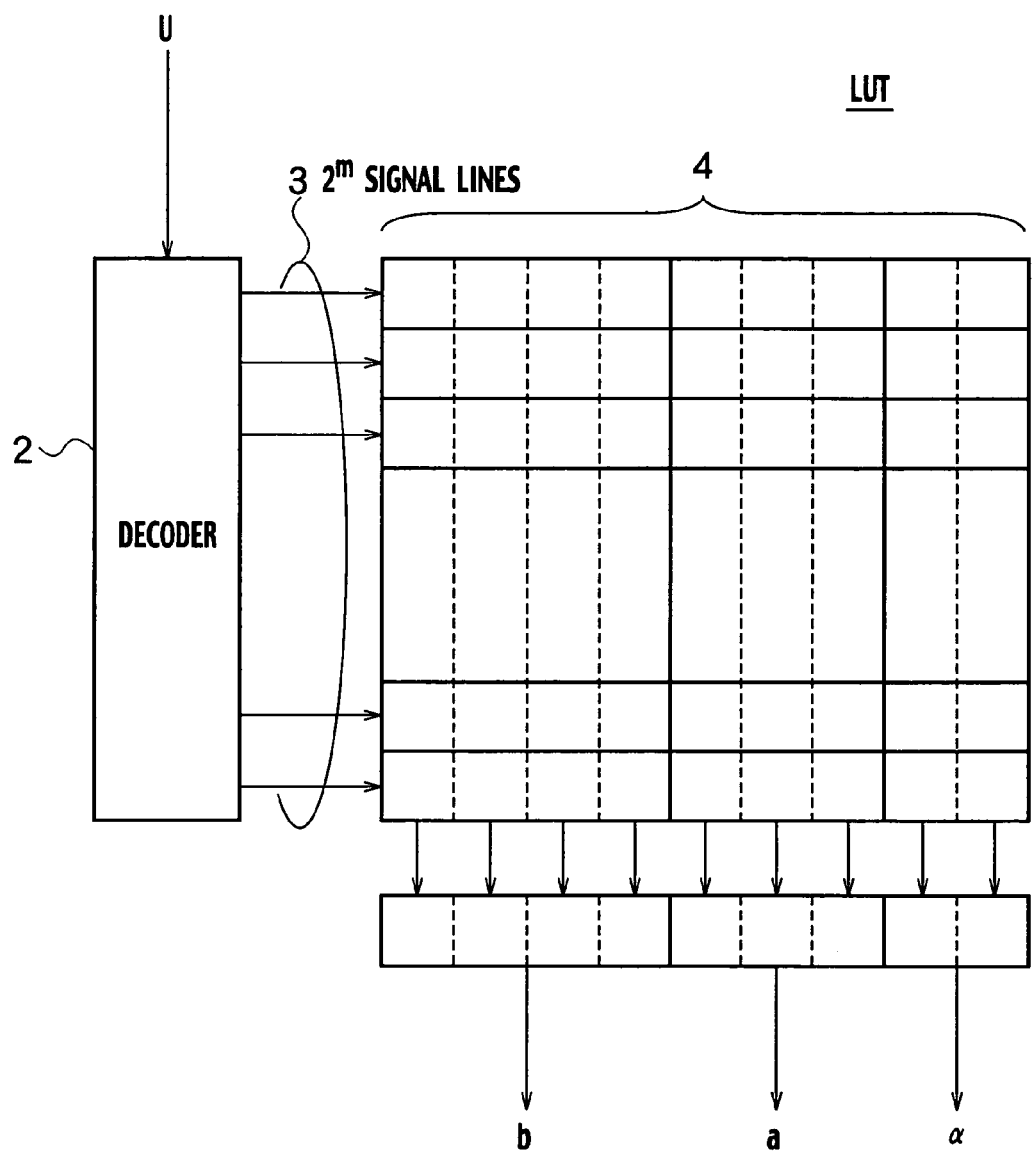
FIG. 8 is a block diagram of an LUT0 in the arithmetic unit according to the first embodiment.

As shown in FIG. 7, an arithmetic unit 8 according to a first embodiment includes an LUT0, an offset circuit 9, a multiplier 10, an adder 11, a determination circuit 13, and a correction circuit 23. As shown in FIG. 8, the LUT0 includes a decoder 2, signal lines 3, and a memory cell array 4. The high-order bit string U is input to the LUT0, and an initial value b, an inclination a, and a correction value α for the inclination a are then output therefrom.

The LUT0 includes an LUT1 to which the high-order bit string U is input and from which the initial value b is output, an LUT2 to which the high-order bit string U is input and from which the inclination a is output, and an LUT3 to which the high-order bit string U is input and from which the correction value α for the inclination a is output.

Figure 9:
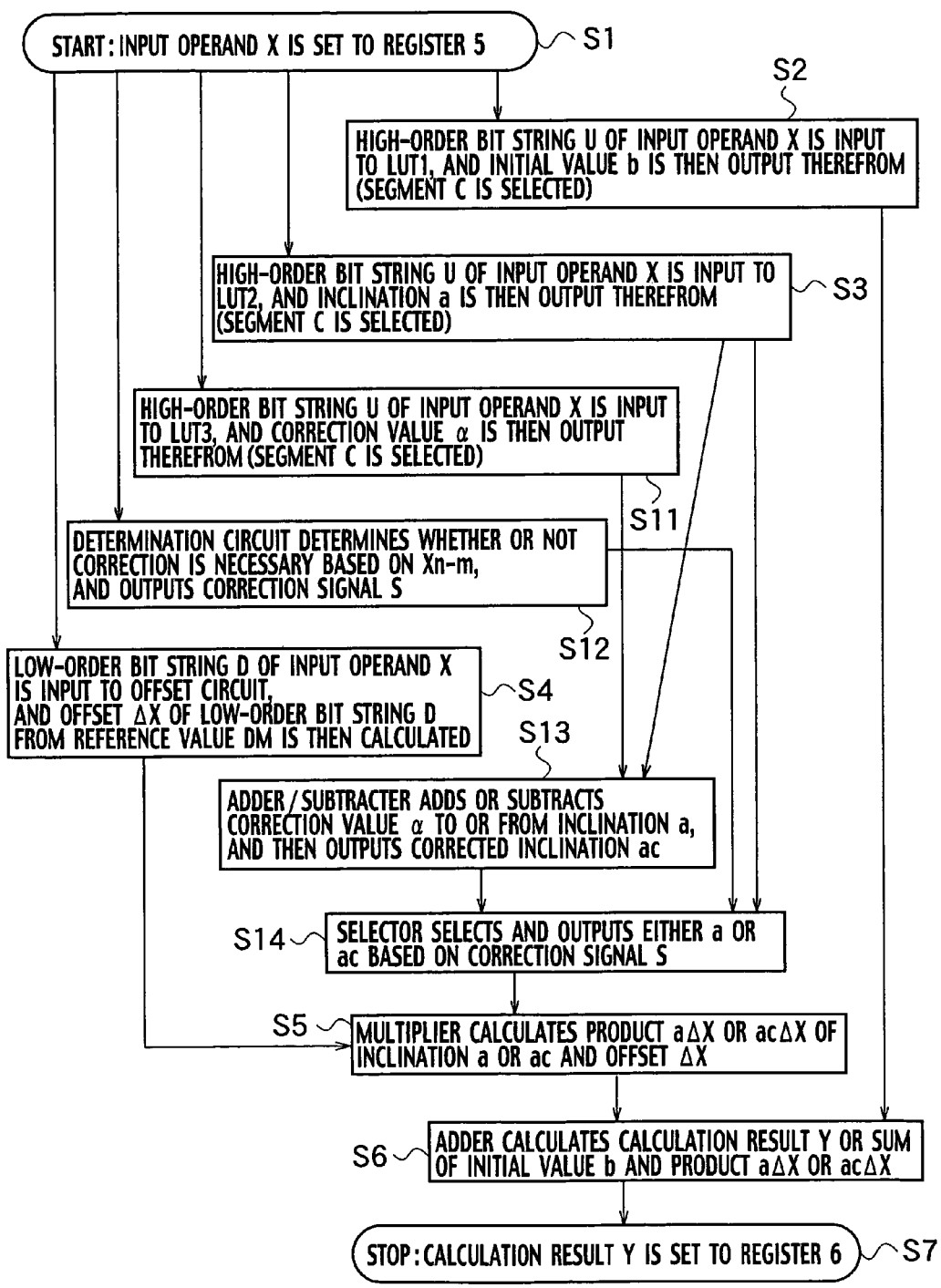
FIG. 9 is a flowchart for a calculation method of the arithmetic unit according to the first embodiment.

In step S2 of FIG. 9, the high-order bit strings U0 to U7 are input to the LUT1 and initial values b10 to b17 are then output therefrom. In step S3, the high-order bit strings U0 to U7 are input to the LUT2 and inclinations a10 to a17 are then output therefrom. In step S11, the high-order bit strings U0 to U7 are input to the LUT3 and correction values α10 to α17 are then output therefrom. It is assumed that in the segment C, the correction value α for correction of the inclination a is smaller than the inclination a. This assumption allows reduction in the error between a function and a corresponding straight line without causing an exponential increase in the LUT0 size.

The determination circuit 13 includes a buffer 14 when each of the segments C0 to C7 is divided in half: the left half being a region not to be corrected, and the right half being a region to be corrected. Note that the buffer 14 is only a sample and; alternatively, the determination circuit 13 may include logic circuits corresponding to the divided regions to be corrected and not to be corrected, respectively, in each of the segments C0 to C7. For example, in step S12, the most significant bit Xn-m of the low-order bit string D in the operand X is input to the buffer 14, and a correction signal S is then output therefrom. If the most significant bit Xn-m of the low-order bit string D is 0, 0 is then output as the correction signal S to indicate that correction is unnecessary. Otherwise, if the most significant bit Xn-m is 1, 1 is then output as the correction signal S to indicate that correction is necessary.

The correction signal S is input to the correction circuit 23. If correction is necessary according to the correction signal S indicating that correction is necessary, the correction circuit 23 adds or subtracts the correction value α to or from the inclination a to correct the inclination a. The corrected inclination ac is output from the correction circuit 23. Otherwise, if correction is unnecessary according to the correction signal S indicating that correction is unnecessary, the inclination a is output from the correction circuit 23 without correction. The correction circuit 23 includes an adder-subtracter 15 and a selector 16. In step S13, the adder-subtracter 15 adds or subtracts the correction value α to or from the inclination a, and then outputs the corrected inclination ac. In step S14, if correction is necessary, the selector 16 selects and outputs the corrected inclination ac. Otherwise, if correction is unnecessary, the selector 16 selects and outputs the inclination a.

In step S4, the offset circuit 9 calculates the offset ΔX for the low-order bit string D from the reference value DM.

In step S5, the inclination a or the corrected inclination ac is input to the multiplier 10. The multiplier 10 calculates the product aΔX of the inclination a and the offset ΔX, or product acΔX of the corrected inclination ac and the offset ΔX.

In step S6, the adder 11 calculates the sum of the initial value b and the product aΔX or acΔX. The adder 11 outputs the sum aΔX+b or acΔX+b as the calculation result Y.

Next, a working example of the first embodiment is described. A case is described where the number of bits m of the high-order bit string U is three. The operands X1 and X2 belong to certain segments, respectively. In the following description, it is assumed that the operand X1 is an operand X that does not need correction. In the following description, it is assumed that the operand X2 is an operand X that needs correction. As in FIG. 5, the domain of the operand X can be divided into $2^3$ segments C0 to C7. There is a one-to-one correspondence between the high-order bit strings U0 to U7 and the segments C0 to C7. The same low-order bit string D as D0 is arranged in the same order within the segments C0 to C7. Therefore, it is apparent that the high-order bit string U indicates one of the segments C0 to C7 to which the operand X belongs, and the operands X1 and X2 belong to the segment C3. In addition, it is understood that when substituting the operands X1 and X2 for the function y=f(x), there is an exact solutions Y01 and Y02.

Figure 10:
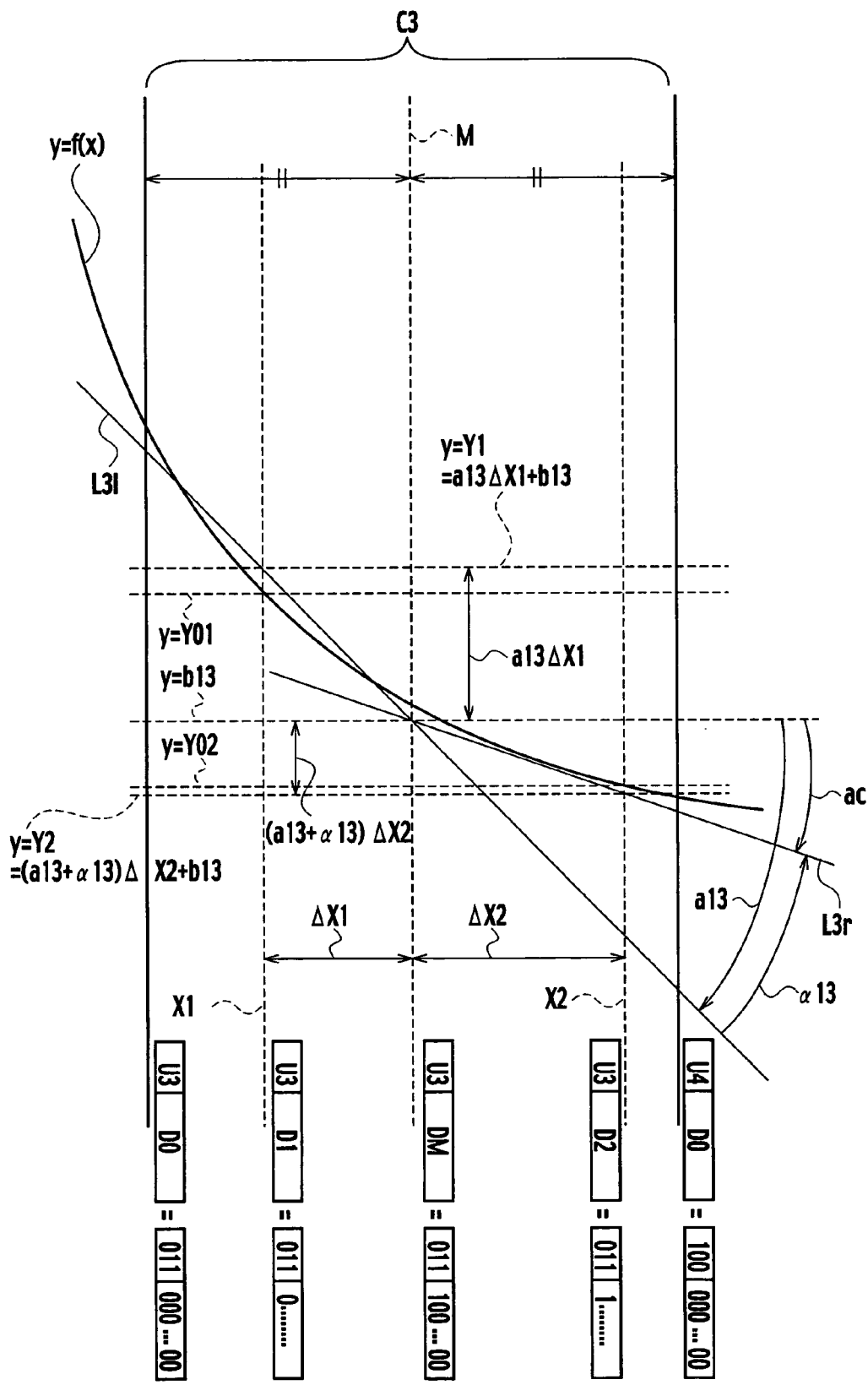
FIG. 10 is a graph showing the relationship between the input operands X1 and X2 and corresponding calculation results Y1 and Y2 using the calculation method for the arithmetic unit according to a working example of the first embodiment.

The low-order bit strings D1 and D2 indicate the positions in the segments C0 to C7 to which the operands X1 and X2 belong. As shown in FIG. 10, it is apparent that the operands X1 and X2 belong to the segment C3.

A certain point within each of the segments C0 to C7, for example, the midpoint M is selected as the reference value DM. Note that the low-order (n-m-1) bit of the operand X or the difference between half of the segment C width and the low-order (n-m-1) bit of the operand X may be considered as the offset ΔX.

In step S2 of FIG. 9, the high-order bit string U3 (011) in each of the operands X1 and X2 is input to the LUT1, and the initial value b13 is then output therefrom.

In step S3, the high-order bit string U3 (011) of each of the operands X1 and X2 is input to the LUT2, and the inclination a13 is output therefrom. A straight line represented by the initial value b13 and the inclination a13 is a straight line L31.

In step S11, the high-order bit string U3 (011) of each of the operands X1 and X2 is input to the LUT3, and the correction value α13 is then output therefrom. The inclination resulting from correcting the inclination a13 with the correction value α13 is inclination ac, and the corrected straight line is straight line L3r.

In step S12, the most significant bit Xn-m of each of the low-order bit strings D1 and D2 in the operands X1 and X2 is input to the determination circuit 13, and the correction signal S is then output therefrom. As shown in FIG. 10, since the most significant bit Xn-m of the low-order bit string D1 in the operand X1 is 0, 0 is output as the correction signal S to indicate that correction is unnecessary. On the other hand, since the most significant bit Xn-m of the low-order bit string D2 of the operand X2 is 1, 1 is output as the correction signal S to indicate that correction is necessary.

In step S13, the adder-subtracter 15 adds or subtracts the correction value α13 to or from the inclination a13, and then outputs the corrected inclination ac (=a13+α13).

In step S14, the selector 16 selects and outputs the inclination a13 since the operand X1 does not need to be corrected. On the other hand, the selector 16 selects and outputs the corrected inclination ac since the operand X2 needs to be corrected.

In step S4, the offset circuit 9 calculates an offset ΔX1 or the difference between the reference value DM and the low-order bit string D1 in the operand X1. The offset circuit 9 calculates an offset ΔX2 or the difference between the reference value DM and the low-order bit string D2 in the operand X2.

In step S5, the multiplier 10 calculates the product a13ΔX1 of the offset ΔX1 and the inclination a13 in the operand X1. The multiplier 10 calculates the product (a13+α13) ΔX2 of the offset ΔX2 and the corrected inclination ac (=a13+α13) in the operand X2.

In step S6, the adder 11 calculates the calculation result Y1 (=a3ΔX1+b13) or the sum of the product a13ΔX1 and the initial value b13 of the operand X1, and then outputs the result to the register 6. The adder 11 calculates the calculation result Y2 (=(a13+α13)ΔX2+b13) or the sum of the product (a13+α13)ΔX2 and the initial value b13 of the operand X2, and then outputs the result to the register 6.

In the first embodiment, whether correction is necessary is determined by using the high-order bit Xn-m of the low-order bit strings D1 and D2 in the operands X1 and X2. If correction is necessary, the initial values b10 to b17 and the inclinations a10 to a17 are corrected. This allows provision of a highly accurate approximation without considerable increase in circuit size. In addition, the approximation accuracy can be improved by adding a simple circuit without increase in the number of entries $2^m$ in the LUT0. On the other hand, the circuit area of the first embodiment can be reduced as long as enhancement of the approximation accuracy is unnecessary.

Note that a straight line represented by the initial value b13 and the inclination a13 is straight line L31. The initial value b13 and the inclination a13 are predetermined so as to minimize the error between the straight line and the function f(x)

in the left half region in the segment C3, which is divided in half at the midpoint M corresponding to the reference value DM. The determination circuit 13 determines that correction is necessary only when the high-order bit Xn-m of the low-order bit strings D1 and D2 in the operands X1 and X2 corresponds to the right half region in the segment C3, which is divided in half at the midpoint M corresponding to the reference value DM. The correction value α corrects the inclination a with the fixed initial value b, and the straight line is then corrected from the straight line L3l into the straight line L3r. A correction value α13 is preset to the correction value α so as to decrease the error between the corrected straight line representing the straight line L3r and the function f(x) in the right half region in the segment C3.

In other words, the inclinations a13 and ac, which allow a decrease in the error, are calculated, and the inclination a13 is then stored in the LUT2 for the respective right half and left half regions sandwiching the midpoint M. The difference between the inclinations ac and a13 is stored in the LUT3 as the correction value α. Depending on the target function f(x), typically, the difference between the inclinations of the adjacent regions is small; therefore, the number of digits of the correction value α can be decreased to less than the number of digits of the inclination a. The area in the LUT3 occupied by the correction value α can be decreased to less than the area in the LUT2 occupied by the inclination a.

According to the first embodiment, a function approximation arithmetic unit, which decreases the error between a function and a corresponding straight line without an exponential increase in LUT size, can be provided.

Second Embodiment

Figure 11:
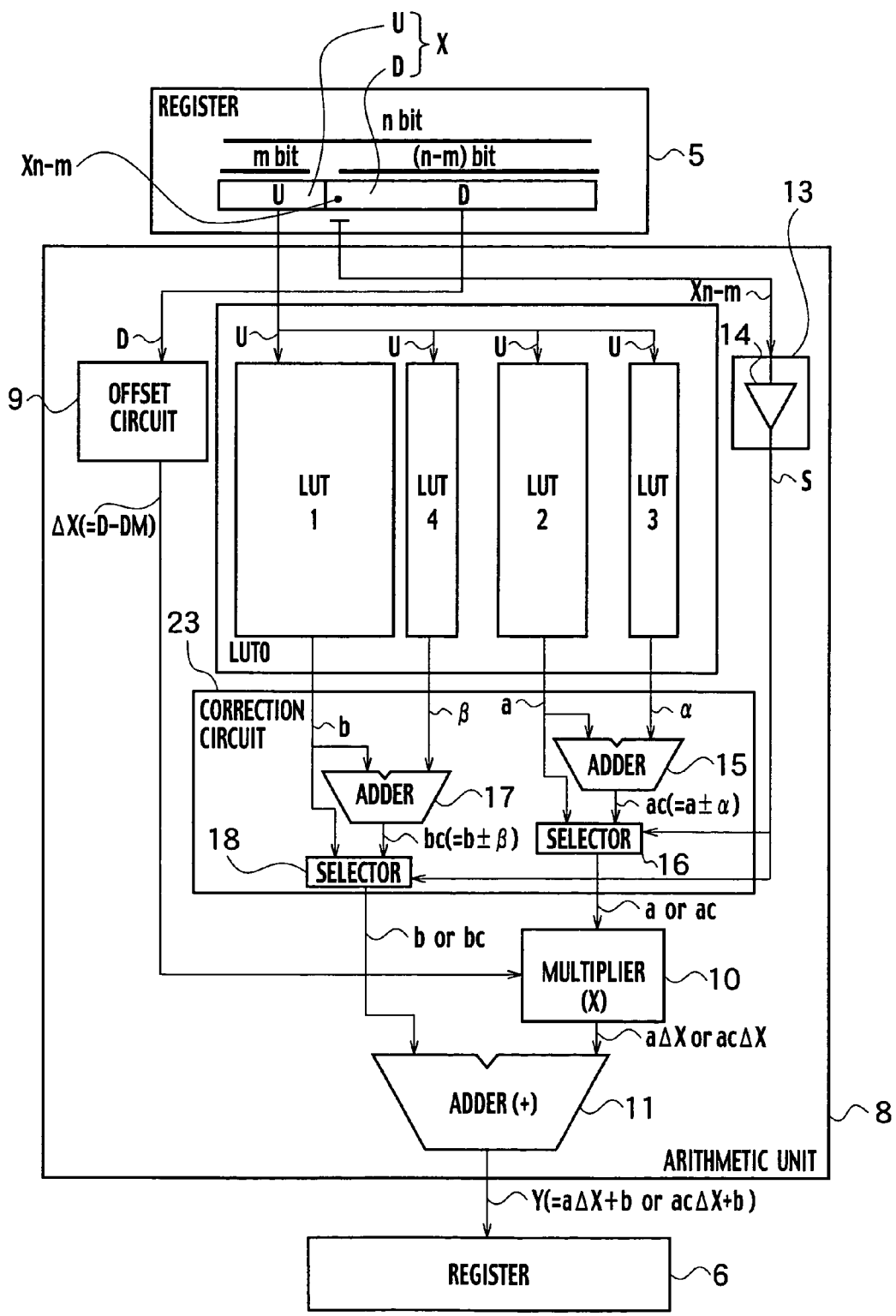
FIG. 11 is a block diagram of an arithmetic unit according to a second embodiment.

As shown in FIG. 11, an arithmetic unit 8 according to a second embodiment includes an LUT0, an offset circuit 9, a multiplier 10, an adder 11, a determination circuit 13, and a correction circuit 23. The LUT0 includes a LUT1, a LUT2, a LUT3, and a LUT4.

Figure 12:
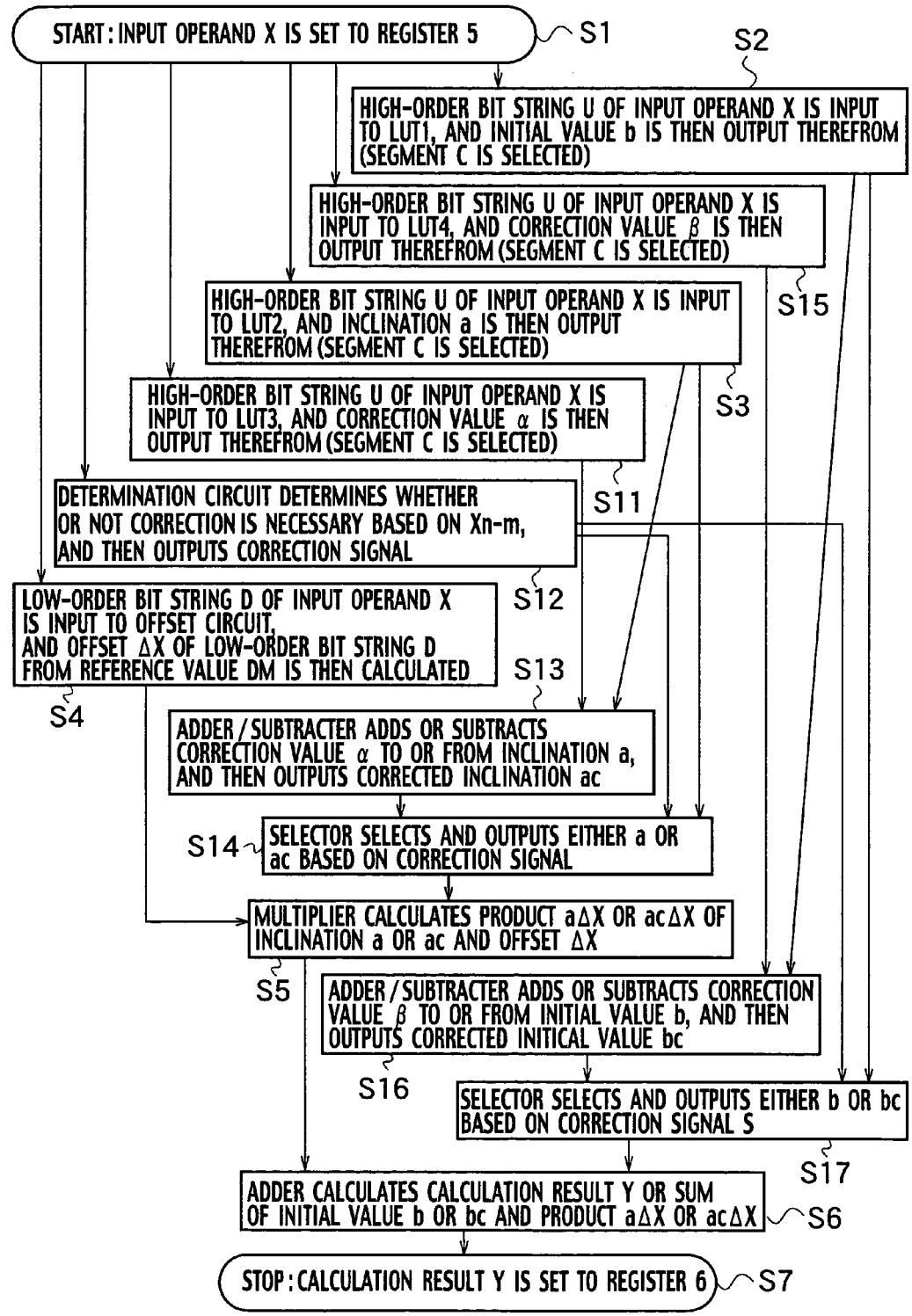
FIG. 12 is a flowchart for a calculation method for the arithmetic unit according to the second embodiment.

In step S2 of FIG. 12, high-order bit strings U0 to U7 are input to the LUT1, and initial values b20 to b27 are then output therefrom. In step S3, the high-order bit strings U0 to U7 are input to the LUT2, and inclinations a20 to a27 are then output therefrom. In step S11, the high-order bit strings U0 to U7 are input to the LUT3, and correction values (α20 to α27 are then output therefrom. In step S15, the high-order bit strings U0 to U7 are input to the LUT4, and correction values β20 to β27 are then output therefrom. The correction value β, which is used to correct an initial value b, is smaller than the initial value b. This decreases in the error between a function and a corresponding straight line without an exponential increase in LUT0 size.

The determination circuit 13 includes a buffer 14 when each of the segments C0 to C7 is divided into halves: the left half that is a region not to be corrected, and the right half that is to be corrected. Note that the buffer 14 is only an example; alternatively, the determination circuit 13 may include logic circuits corresponding to the divided regions to be corrected and not corrected in each of the segments C0 to C7. For example, in step S12, the most significant bit Xn-m of the low-order bit string D in the operand X is input to the buffer 14, and a correction signal S is then output therefrom. The determination circuit 13 functions in the same way as that of the first embodiment.

The correction signal S is input to the correction circuit 23. If correction is necessary, the correction circuit 23 adds or subtracts the correction value α to or from the inclination a to correct the inclination a. The corrected inclination ac is output from the correction circuit 23. If correction is unnecessary, the correction circuit 23 outputs the inclination a without correction.

If correction is necessary, the correction circuit 23 adds or subtracts the correction value β to or from the initial value b to correct the initial value b. The corrected initial value bc is output from the correction circuit 23. If correction is unnecessary, the correction circuit 23 outputs the initial value b without correction. The correction circuit 23 includes adder-subtracters 15 and 17 and selectors 16 and 18. In step S13, the adder-subtracter 15 adds or subtracts the correction value α to or from the inclination a, and then outputs the corrected inclination ac. If correction is necessary, in step S14, the selector 16 selects and outputs the corrected inclination ac. Otherwise, if correction is unnecessary, the selector 16 then selects and outputs the inclination a. In step S16, the adder-subtracter 17 adds or subtracts the correction value β to or from the initial value b, and then outputs the corrected initial value bc. If correction is necessary, in step S17, the selector 18 then selects and outputs the corrected initial value bc. Otherwise, if correction is unnecessary, the selector 18 then selects and outputs the initial value b.

In step S4, the offset circuit 9 calculates the offset ΔX for the low-order bit string D from the reference value DM.

In step S5, the inclination a or the corrected inclination ac is input to the multiplier 10. The multiplier 10 calculates the product aΔX of the inclination a and the offset ΔX, or product acΔX of the corrected inclination ac and the offset ΔX.

In step S6, the adder 11 calculates the sum of the initial value b and the product aΔX, or sum of the corrected initial value bc and the product acΔX. The adder 11 outputs the sum aΔX+b or acΔX+bc as the calculation result Y.

Figure 13:
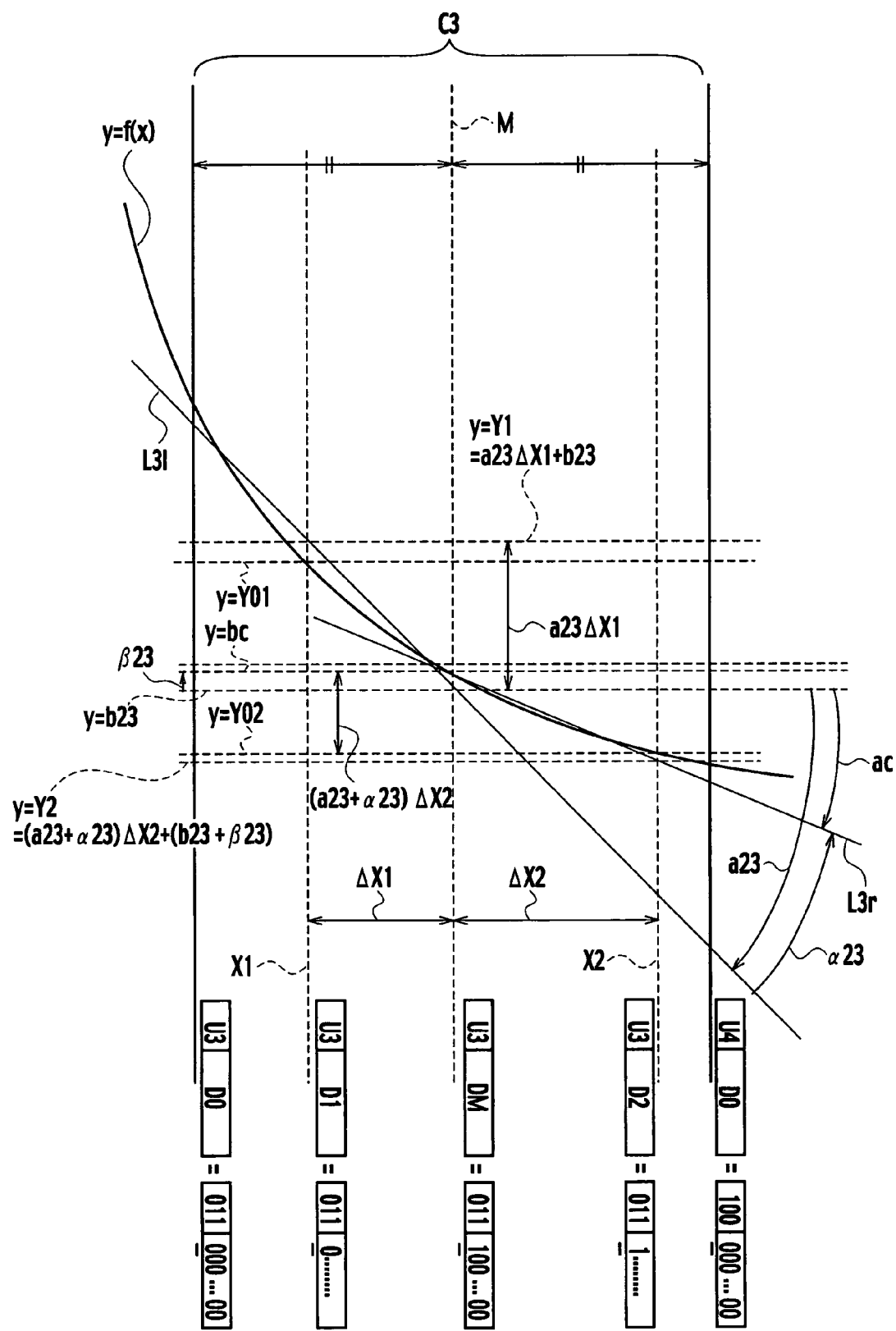
FIG. 13 is a graph showing the relationship between the input operands X1 and X2 and corresponding calculation results Y1 and Y2 using the calculation method for the arithmetic unit according to a working example of the second embodiment.

Next, a working example of the second embodiment is described. A case is described where the number of bits m of the high-order bit string U is three. The operands X1 and X2 belong to certain segments, respectively. In the following description, it is assumed that the operand X1 is an operand X that does not need to be corrected. In the following description, it is assumed that the operand X2 is an operand X that needs to be corrected. As in FIG. 5, the domain of the operand X can be divided into $2^3$ segments C0 to C7. There is a one-to-one correspondence between the high-order bit strings U0 to U7 and the segments C0 to C7. The same low-order bit string D as D0 is arranged in the same order within the segments C0 to C7. Therefore, it is apparent that the high-order bit string U indicates one of the segments C0 to C7 to which the operand X belongs, and, as shown in FIG. 13, the operands X1 and X2 belong to the segment C3. In addition, when substituting the operands X1 and X2 for the function y=f(x), it can be seen that there are exact solutions Y01 and Y02.

The low-order bit strings D1 and D2 indicate the positions in the segments C0 to C7 to which the operands X1 and X2 belong. As shown in FIG. 13, it is apparent that the operands X1 and X2 belong to the segment C3.

A point within each of the segments C0 to C7, for example, the midpoint M in each thereof is selected as the reference value DM.

In step S2 of FIG. 12, the high-order bit string U3 (011) of each of the operands X1 and X2 is input to the LUT1, and initial value b23 is then output therefrom.

In step S3, the high-order bit string U3 (011) of each of the operands X1 and X2 is input to the LUT2, and inclination a23 is then output therefrom. A straight line represented by the initial value b23 and the inclination a23 is straight line L3l.

In step S11, the high-order bit string U3 (011) of each of the operands X1 and X2 is input to the LUT3, and correction value α23 is then output therefrom. The inclination resulting from correcting the inclination a23 with the correction value α23 is the corrected inclination ac.

In step S15, the high-order bit string U3 (011) of each of the operands X1 and X2 is input to the LUT4, and correction value β23 is then output therefrom. The inclination resulting from correcting the initial value b23 with the correction value β23 is the corrected initial value bc. A corrected straight line represented by the corrected inclination ac and the corrected initial value bc is straight line L3r.

In step S12, the most significant bit Xn-m of each of the low-order bit strings D1 and D2 of the operands X1 and X2 is input to the determination circuit 13, and a correction signal S is then output therefrom. As shown in FIG. 13, since the most significant bit Xn-m of the low-order bit string D1 in the operand X1 is 0, 0 is output as the correction signal S indicating that correction is unnecessary. On the other hand, since the most significant bit Xn-m of the low-order bit string D2 in the operand X2 is 1, 1 is output as the correction signal S indicating that correction is necessary.

In step S13, the adder-subtracter 15 adds or subtracts the correction value α23 to or from the inclination a23, and then outputs the corrected inclination ac (=a23+α23).

In step S14, the selector 16 selects and outputs the inclination a23 since the operand X1 does not need to be corrected. On the other hand, the selector 16 selects and outputs the corrected inclination ac since the operand X2 needs to be corrected.

In step S16, the adder-subtracter 17 adds or subtracts the correction value β23 to or from the initial value b23, and then outputs the corrected initial value bc (=b23+β23).

In step S17, the selector 18 selects and outputs the initial value b23 since the operand X1 does not need to be corrected. On the other hand, the selector 18 selects and outputs the corrected initial value bc since the operand X2 needs to be corrected.

In step S4, the offset circuit 9 calculates an offset ΔX1 or the difference between the reference value DM and the low-order bit string D1 of the operand X1. The offset circuit 9 calculates an offset ΔX2 or the difference between the reference value DM and the low-order bit string D2 of the operand X2.

In step S5, the multiplier 10 calculates the product a23ΔX1 of the offset ΔX1 and the inclination a23 of the operand X1. The multiplier 10 calculates the product (a23+α23) ΔX2 of the offset ΔX2 and the corrected inclination ac (=a23+α23) of the operand X2.

In step S6, the adder 11 calculates the calculation result Y1 (=a23ΔX1+b23) or the sum of the product a23ΔX1 and the initial value b23 of the operand X1, and then outputs the resulting value to the register 6. The adder 11 calculates the calculation result Y2 (=(a23+α23) ΔX2+(b23+β23)) or the sum of the product (a23+α23) ΔX2 and the corrected initial value bc (b23+β23) of the operand X2, and then outputs the resulting value to the register 6.

In the second embodiment, whether or not correction is necessary is determined by using the high-order bit Xn-m of the low-order bit strings D1 and D2 in the operands X1 and X2. If correction is necessary, the initial values b20 to b27 and the inclinations a20 to a27 are corrected. This provides a highly accurate approximation without considerable increase in circuit size. In addition, the approximation accuracy can be improved by adding a simple circuit without increasing in the number of entries in the LUT0. The circuit area of the second embodiment can be reduced compared to the prior arts as long as enhancement of the approximation accuracy is not required.

Note that a straight line represented by the initial value b23 and the inclination a23 is straight line L31. The initial value b23 and the inclination a23 are predetermined so as to decrease the error between the straight line and the function f(x) in the left half region in the segment C3, which is divided in half at the midpoint M corresponding to the reference value DM. The determination circuit 13 determines that correction is necessary only when the high-order bit Xn-m of the low-order bit strings D1 and D2 in the operands X1 and X2 corresponds to the divided right half region in the segment C3. The correction values a and A are used to correct the inclination a and the initial value b, and the straight line L31 is corrected to straight line L3r. The correction values α23 and β23 are predetermined so as to decrease the error between the corrected straight line indicating the straight line L3r and the function f(x) in the right half region in the segment C3.

In other words, the inclinations a23 and ac and the initial values b23 and bc, which minimize the error, are calculated, and the initial value b23 is stored in the LUT1, and the inclination a23 is then stored in the LUT2 for the right half and the left half region sandwiching the midpoint M. The difference between the inclinations ac and a23 is stored in the LUT3 as the correction value α23, and the difference between the initial values bc and b23 is stored in the LUT4 as the correction value β23. Since the difference of the inclinations a in the adjacent segments is small, the size of the LUT3 for the correction value α can be smaller than the size of the LUT2 for the inclination a. Similarly, since the difference of the initial values b in the adjacent regions is small, the size of the LUT4 for the correction value β can be smaller than the size of the LUT1 for the initial value b.

According to the second embodiment, a function approximation arithmetic unit, which decreases in the error between a function and a corresponding straight line without an exponential increase in LUT size, can be provided.

Third Embodiment

Figure 14:
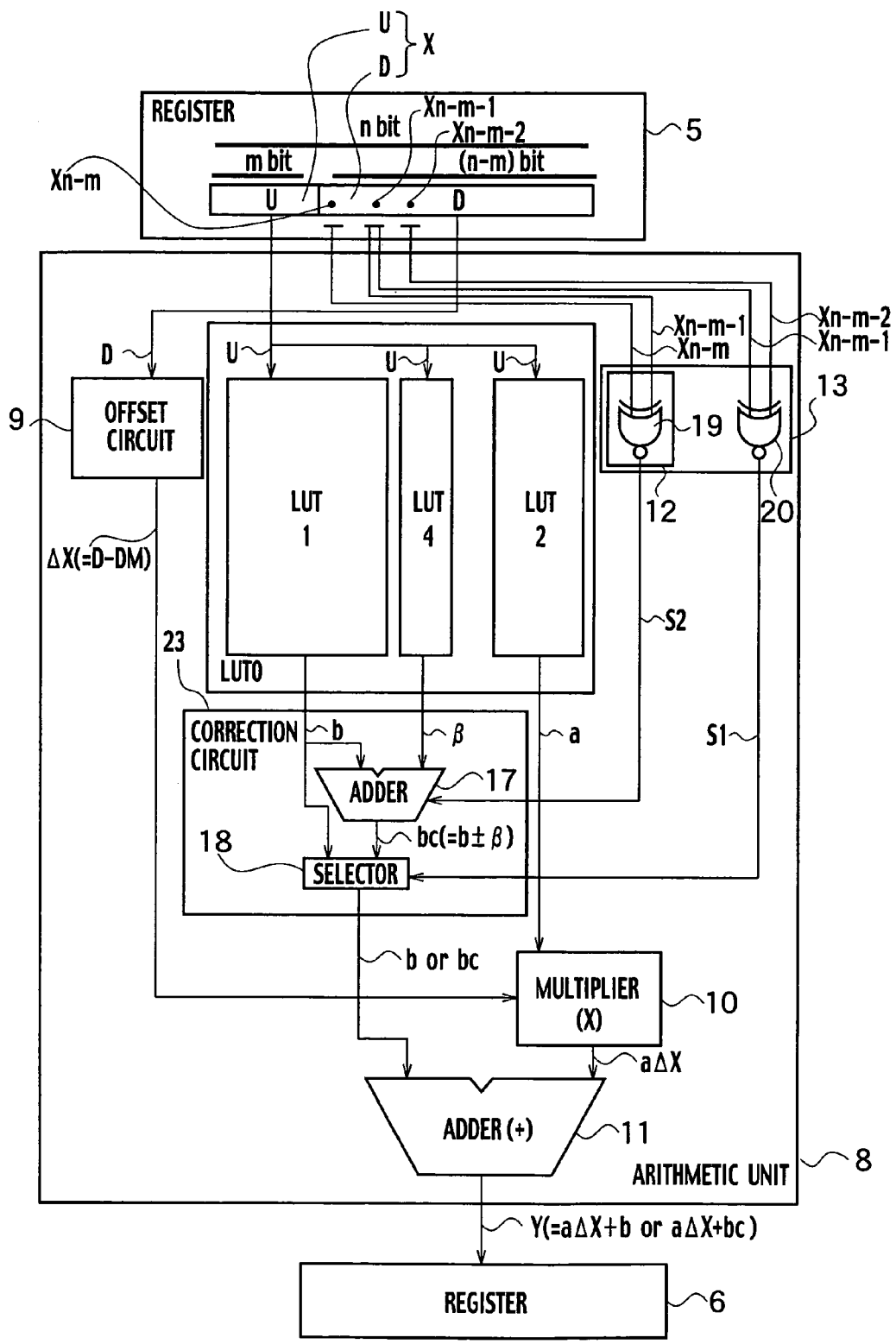
FIG. 14 is a block diagram of an arithmetic unit according to a third embodiment.

As shown in FIG. 14, an arithmetic unit 8 according to a third embodiment includes an LUT0, an offset circuit 9, a multiplier 10, an adder 11, a determination circuit 13, and a correction circuit 23. The determination circuit 13 includes an addition-subtraction determination circuit 12. The LUT0 includes an LUT1, an LUT2, and an LUT4.

Figure 15:
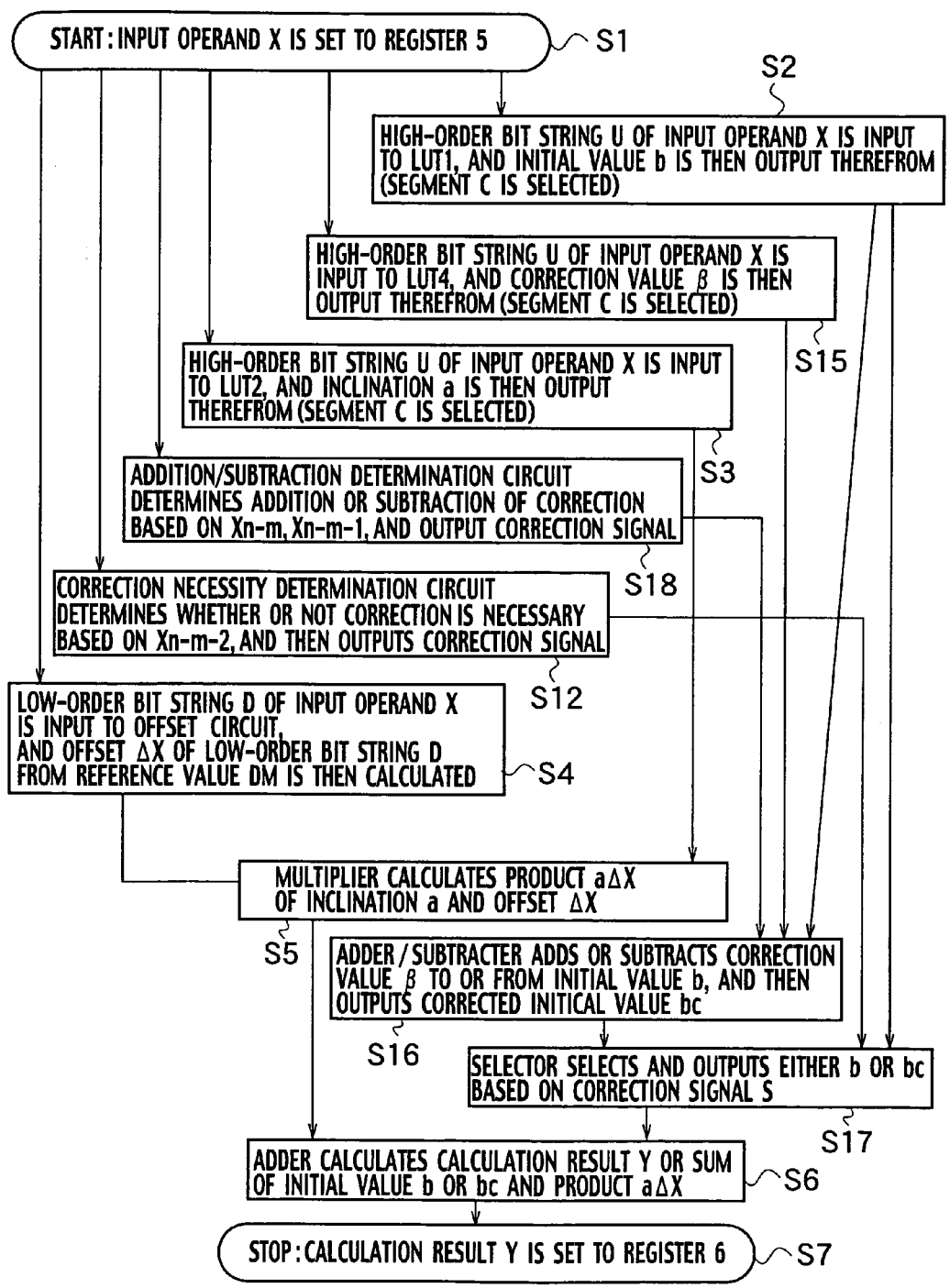
FIG. 15 is a flowchart for a calculation method for the arithmetic unit according to the third embodiment.

In step S2 of FIG. 15, the high-order bit strings U0 to U7 are input to the LUT1, and initial values b40 to b47 are then output therefrom. In step S3, the high-order bit strings U0 to U7 are input to the LUT2 and inclinations a40 to a47 are then output therefrom. In step S15, the high-order bit strings U0 to U7 are input to the LUT4, and correction values β40 to β47 are then output therefrom.

The determination circuit 13 includes an exclusive OR inverter 20 for the case of dividing each of the segments C0 to C7 into eight regions in which both ends and central regions are to be corrected, and the other regions are not to be corrected. Note that the exclusive OR inverter 20 is only an example; alternatively, the determination circuit 13 may include logic circuits corresponding to the divided regions to be corrected and not to be corrected, respectively, in each of segments C0 to C7. For example, in step S12, the second high-order bit Xn-m-1 and the third high-order bit Xn-m-2 of the low-order bit string D in the operand X are input to the exclusive OR inverter 20, and a correction signal S1 is then output therefrom. When (Xn-m-1, Xn-m-2) is (0, 1) and (1, 0), 0 is output as the correction signal S1 indicating that correction is unnecessary. When (Xn-m-1, Xn-m-2) is (0, 0) and (1, 1), 1 is output as the correction signal S1 indicating that correction is necessary.

The addition-subtraction determination circuit 12 includes an exclusive OR inverter 19 for dividing each of the segments C0 to C7 into eight regions in which both ends are to be corrected by addition, and the central region is to be corrected by subtraction. Note that the exclusive OR inverter 19 is only an example; alternatively, the addition-subtraction determination circuit 12 may include logic circuits corresponding to the divided regions to be corrected by addition and to be corrected by subtraction in each segment C0 to C7. For example, in step S18, the most significant bit Xn-m and the second high-order bit Xn-m-1 of the low-order bit string D in the operand X are input to the addition-subtraction determination circuit 12, and an addition-subtraction signal S2 is then output therefrom. When (Xn-m, Xn-m-1) is (0, 1) and (1, 0), 0 is output as the addition-subtraction signal S2 indicating subtraction. When (Xn-m, Xn-m-1) is (0, 0) and (1, 1), 1 is output as the addition-subtraction signal S2 indicating addition.

The correction signal S1 and the addition-subtraction signal S2 are input to the correction circuit 23. If the addition-subtraction signal S2 indicates addition, the correction circuit 23 adds the correction value β to the initial value b to correct the initial value b. Otherwise, if the addition-subtraction signal S2 indicates subtraction, the correction circuit 23 subtracts the correction value β from the initial value b to correct the initial value b. If the correction signal S1 indicates that correction is necessary, the corrected initial value bc is output from the correction circuit 23. Otherwise, if the correction signal S1 indicates that correction is unnecessary, the correction circuit 23 outputs the initial value b without correction. The correction circuit 23 includes an adder-subtracter 17 and a selector 18. In step S16, the adder-subtracter 17 adds or subtracts the correction value β¤ to or from the initial value b by using the addition-subtraction signal S2, and then outputs the corrected initial value bc. If correction is necessary, in step S17, the selector 18 then selects and outputs the corrected initial value bc. Otherwise, if correction is unnecessary, the selector 18 selects and outputs the initial value b.

In step S4, the offset circuit 9 calculates the offset ΔX of the low-order bit string D from the reference value DM.

In step S5, the inclination a is input to the multiplier 10. The multiplier 10 calculates the product aΔX of the inclination a and the offset ΔX.

In step S6, the adder 11 calculates the sum of the product aΔX and the initial value b or the corrected initial value bc. The adder 11 outputs the sum aΔX+b or aΔX+bc as the calculation result Y.

Figure 16:
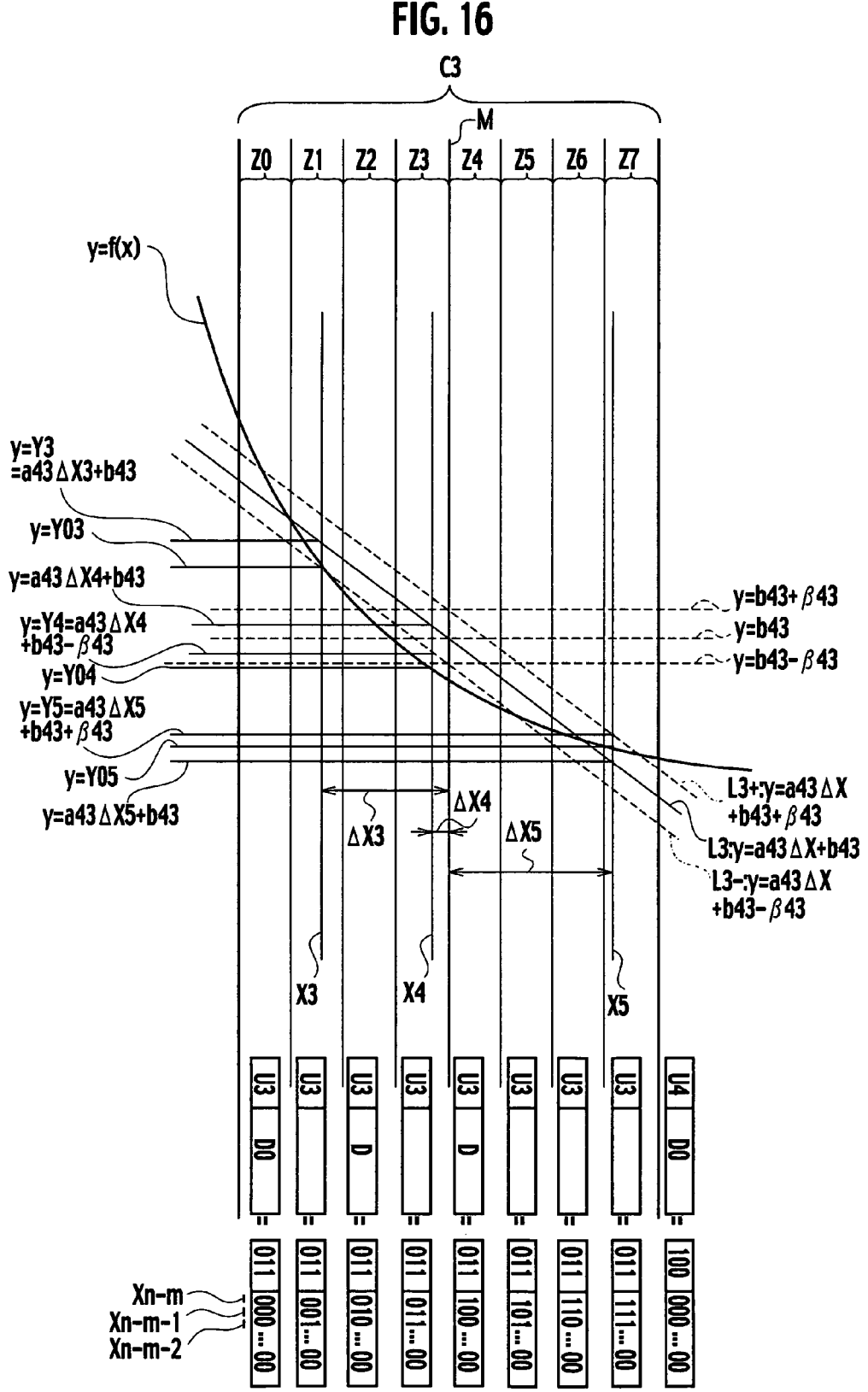
FIG. 16 is a graph showing the relationship between the input operands X1 and X2 and corresponding calculation results Y1 and Y2 using the calculation method for the arithmetic unit according to a working example of the third embodiment.

Next, a working example of the third embodiment is described. A case is described where the number of bits m of the high-order bit string U is three. The operands X3, X4, and X5 belong to certain segments, respectively. In the following description, it is assumed that the operand X3 is operand X that does not need to be corrected. In the following description, it is assumed that the operand X4 is operand X that needs to be corrected by subtraction. In the following description, it is assumed that the operand X5 is operand X that needs to be corrected by addition. As in FIG. 5, the domain of the operand X can be divided into $2^3$ segments C0 to C7. There is a one-to-one correspondence between the high-order bit strings U0 to U7 and the segments C0 to C7. The same low-order bit string D as D0 is arranged in the same order within the segments C0 to C7. Therefore, it is apparent that the high-order bit string U indicates one of the segments C0 to C7 to which the operand X belongs, and, as shown in FIG. 16, the operands X3, X4, and X5 belong to the segment C3. In addition, when substituting the operands X3, X4, and X5 for the function y=f(x), it can be seen that there are exact solutions Y03, Y04, and Y05.

The low-order bit string D of the operand X indicates the positions in the segments C0 to C7 to which operands X3 to X5 belong. In FIG. 16, pay attention to the top three bits Xn-m, Xn-m-1, and Xn-m-2 of the low-order bit string D. The segment C3 can be subdivided by the top three bits Xn-m, Xn-m-1, and Xn-m-2 into $2^3$ or 8 regions Z0 to Z7. There is a one-to-one correspondence between (0, 0, 0), (0, 0, 1), (0, 1, 0), (0, 1, 1), (1, 0, 0), (1, 0, 1),(1, 1, 0),and (1, 1, 1) of the top three bits (Xn-m, Xn-m-1, Xn-m-2) and the regions Z0 to Z7. Therefore, it is apparent that the top three bits (Xn-m, Xn-m-1, Xn-m-2) indicate one of the regions Z0 to Z7 to which the operand X belongs, and the operands X3, X4, and X5 belong to the regions Z1, Z3, and Z7, respectively. In addition, it is apparent that the operands X3, X4, and X5 belong to the segment C3. A point within each of segments C0 to C7, for example, the midpoint M in each thereof is selected as the reference value DM.

In step S2 of FIG. 15, the high-order bit string U3 (011) of each of the operands X3 through X5 is input to the LUT1, and initial value b43 is then output therefrom.

In step S3, the high-order bit string U3 (011) of each of the operands X3 through X5 is input to the LUT2, and inclination a43 is then output therefrom. A straight line represented by the initial value b43 and the inclination a43 is straight line L3.

In step S15, the high-order bit string U3 (011) of each of the operands X3 through X5 is input to the LUT4, and correction value β43 is then output therefrom. The initial value resulting from adding the initial value b43 to the correction value β43 or subtracting the initial value b43 from the correction value β43 is the corrected initial value bc. Corrected straight lines represented by the corrected initial value bc are straight lines L3+ and L3.

In step S12, the second high-order bit Xn-m-1 and the third high-order bit Xn-m-2 of the low-order bit string D in the operand X are input to the determination circuit 13, and a correction signal S1 is then output therefrom. As shown in FIG. 16, 1 indicating that correction is necessary is output as the correction signal S1 only when the top three bits (Xn-m, Xn-m-1, Xn-m-2) are (0, 0, 0), (0, 1, 1), (1, 0, 0), or (1, 1, 1). In addition, 1 indicating that correction is necessary is output as the correction signal S1 only when the operand X belongs to a region Z0, Z3, Z4, or Z7. In this case, since the operand X3 belongs to the region Z1, 0 is output as the correction signal S1 indicating that correction is unnecessary. On the other hand, since the operands X4 and X5 belong to the regions Z3 and Z7, respectively, 1 is output as the correction signal S1 indicating that correction is necessary.

In step S18, the most significant bit Xn-m and the second high-order bit Xn-m-1 of the low-order bit string D in the operand X are input to the addition-subtraction determination circuit 12, and an addition-subtraction signal S2 is then output therefrom. As shown in FIG. 16, 1 indicating addition is output as the addition-subtraction signal S2 only when the top three bits (Xn-m, Xn-m-1, Xn-m-2) are (0, 0, 0), (0, 0, 1), (1, 1, 0), or (1, 1, 1). In addition, 1 indicating addition is output as the addition-subtraction signal S2 only when the operand X belongs to a region Z0, Z1, Z6, or Z7. In this case, since the operands X3 and X5 belong to the regions Z1 and Z7, 1 is output as the addition-subtraction signal S2 indicating addition. On the other hand, since the operand X4 belongs to the region Z3, 0 is output as the addition-subtraction signal S2 indicating subtraction.

Note that whether or not correction is necessary, an indication for addition-subtraction of correction values for the regions Z0 to Z7 are shown. The regions Z0 and Z7 need correction, and a correction value is added. The regions Z3 and Z4 need correction, and a correction value is subtracted. On the other hand, the regions Z1, Z2, Z5, and Z6 do not need correction. If correction is unnecessary, a correction value is not added or subtracted.

In step S16, the adder-subtracter 17 adds the correction value β43 to the initial value b43 or subtracts the correction value β43 from the initial value b43, by using the addition-subtraction signal S2, and then outputs the corrected initial value bc (=b43+β43 or b43−β43). In this case, since the operands X3 and X5 belong to the regions Z1 and Z7, the corrected initial value bc (=b43+β43) is output. On the other hand, since the operand X4 belongs to the region Z3, the corrected initial value bc (=b43−β43) is output.

In step S17, the selector 18 selects and outputs the initial value b43, since the operand X3 belongs to the region Z1 and does not need correction. Since the operand X4 belongs to the region Z3 and needs correction, the selector 18 outputs the corrected initial value bc (=b43−β43). Since the operand X5 belongs to the region Z7 and needs correction, the selector 18 outputs the corrected initial value bc (=b43+β43).

In step S4, the offset circuit 9 calculates the offsets ΔX3 to ΔX5 or the difference between the reference value DM and the low-order bit string D of each of the operands X3 to X5.

In step S5, the multiplier 10 calculates the products a43ΔX3 to a43ΔX5 of the inclination a43 and each of the offsets ΔX3 to ΔX5 of the operands X3 to X5.

In step S6, the adder 11 calculates the calculation result Y3 (=a43ΔX3 +b43) or the sum of the product a43ΔX3 and the initial value b43 of the operand X3, and then outputs the resulting value to the register 6. The adder 11 calculates the calculation result Y4 (=a43ΔX4+b43−β43) or the sum of the product a43ΔX4 and the corrected initial value bc (=b43−β43) of the operand X4, and then outputs the result to the register 6. The adder 11 calculates the calculation result Y5 (=a43ΔX5+b43+β43) or the sum of the product a43ΔX5 and the corrected initial value bc (=b43+β43) of the operand X5, and then outputs the resulting value to the register 6.

According to the third embodiment, whether or not correction is necessary is determined by using the high-order bits $X_{n-m-1}$ and $X_{n-m-2}$ of the low-order bit string D in the operand X. The correction value is added to the high-order bits $X_{n-m}$ and $X_{n-m-1}$ of the low-order bit string D or subtracted from the high-order bits $X_{n-m}$ and $X_{n-m-1}$ for correction. If correction is necessary, the correction value is added to the initial values b40 to b47 or subtracted from the initial values b40 to b47. This provides a highly accurate approximation without a considerable increase in circuit size. In addition, the approximation accuracy can be improved by adding a simple circuit without an increase in the number of entries $2^m$ in the LUT0. On the other hand, the circuit area of the third embodiment can be reduced to less than that of the prior art as long as enhancement of the approximation accuracy is not required.

Note that a straight line represented by the initial value b43 and the inclination a43 is straight line L3. The initial value b43 and the inclination a43 are predetermined so as to decrease the error between the straight line L3 and the function f(x) in the regions Z1, Z2, Z5, and Z6. The initial value bc is predetermined so as to decrease the error between the straight line L3+and the function f(x) in the regions Z0 and Z7. The initial value bc is predetermined so as to decrease the error between the straight line L3- and the function f(x) in the regions Z3 and Z4. The correction value β43 is predetermined by using the prescribed initial value bc. Since the difference of the initial values b in the adjacent regions Z0 to Z7 is small, the LUT4 size for the correction value P can be decreased to less than the LUT1 size for the initial value b.

According to the third embodiment, a function approximation arithmetic unit, which decreases the error between a function and a corresponding straight line without a considerable increase in LUT size, can be provided.

Fourth Embodiment

Figure 17:
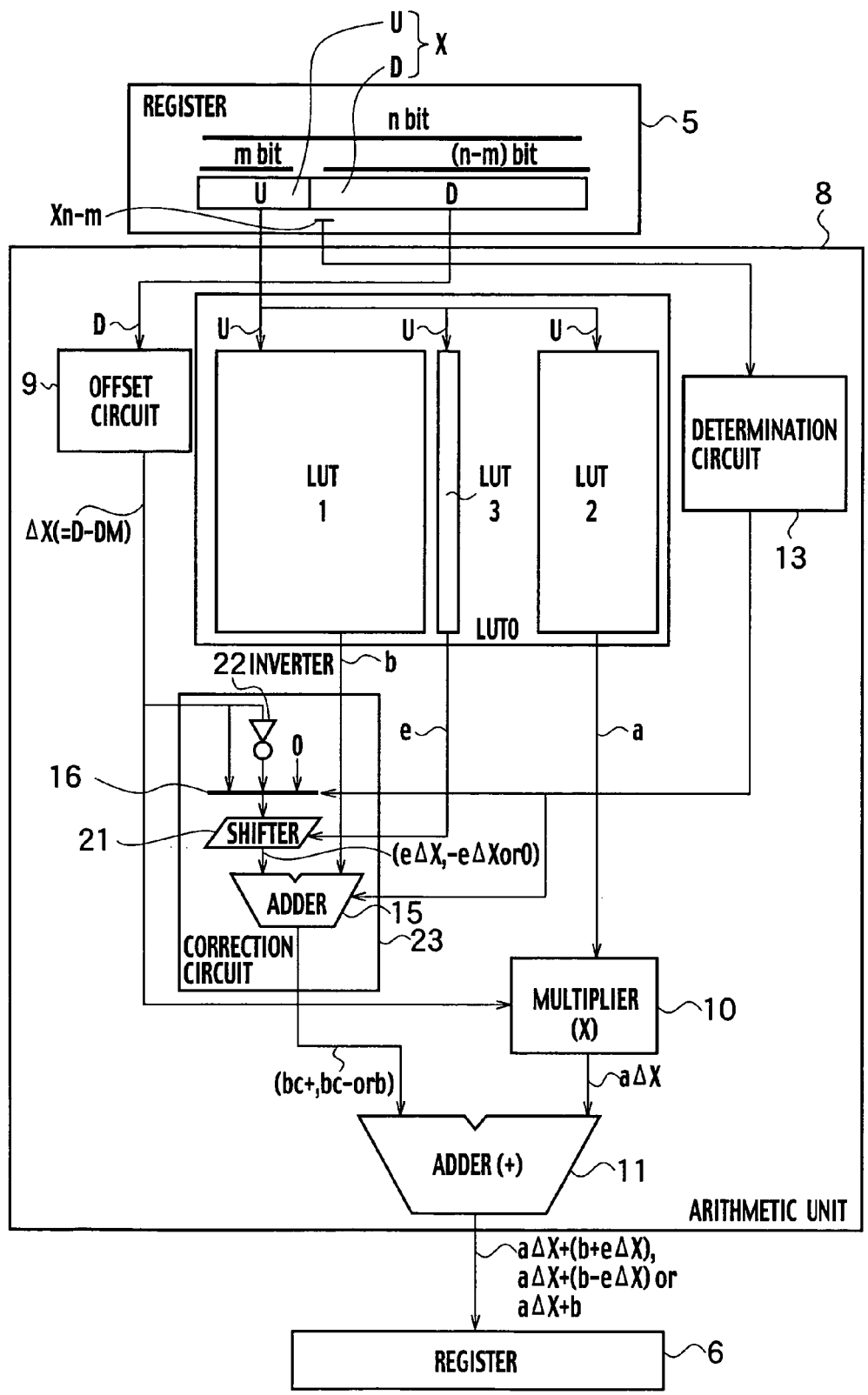
FIG. 17 is a block diagram of an arithmetic unit according to a fourth embodiment.

As shown in FIG. 17, an arithmetic unit 8 according to a fourth embodiment includes an LUT0, an offset circuit 9, a multiplier 10, an adder 11, a determination circuit 13, and a correction circuit 23.

The LUT0 includes an LUT1, an LUT2, and an LUT3. The high-order m bits U (m<n) of the n-bit input operand X are input to the LUT1, and an initial value b corresponding to the high-order m bits U is then output therefrom. An inclination a corresponding to the same high-order m bits U is output from the LUT2. The same high-order m bits U is input to the LUT3, and the correction shift amount e or the correction amount relative to the initial value b is then output therefrom. In the case of a straight line represented by the initial value b and the inclination a, the error from the target function f(x) tends to increase at the endpoint and the midpoint in the segment C. An inclination value that decreases the error in such a region where the error is large is calculated from the value $2^e$ or the difference of $2^e$ from the inclination a stored in the LUT2. The power e may be a positive number or a negative number. The power e is stored in the LUT3 as the amount of correction shift.

Several high-order bits $X_{n-m}$ of the low-order (n-m) bit D in the input operand X are input to the determination circuit 13, and whether or not correction is necessary is then determined. If the number of the high-order bits $X_{n-m}$ is one bit, the determination circuit 13 determines whether or not correction is necessary as same as the first and the second embodiments. Otherwise, if the number is two or greater bits, the determination circuit 13 determines whether or not correction is necessary as same as the third embodiment.

The offset circuit 9 calculates the offset ΔX between the input operand X and the reference value DM in the domain C specified by the high-order m bits U.

The correction circuit 23 includes an inverter 22, a selector 16, a shifter 21, and an adder-subtracter 15. The selector 16 selects and outputs one of the three inputs of the offset value ΔX, an inverted value of the offset value ΔX, and 0 (zero), which are output from the offset circuit 9, in conformity with the output from the determination circuit 13. The shifter 21 shifts the output from the selector 16 in conformity with the correction shift amount e or the output from the LUT3. Shifting is considered as easy multiplication or division. The adder-subtracter 15 adds the output from the shifter 21 to the initial value b or subtracts the output from the shifter 21 from the initial value b, and then outputs the resulting value; alternatively, the adder-subtracter 15 just outputs the output from the shifter 21 as is.

The multiplier 10 calculates the product aΔX of the inclination a and the offset ΔX.

The adder 11 adds the product aΔX and the initial value b, which is not corrected and is output from the adder-subtracter 15 of the correction circuit 23, or the corrected initial value bc+ or bc-.

In the fourth embodiment, the inclination is corrected by adding the correction value $2^e$ to the inclination a. As a result, Equation (1) before correction is modified as Equation (2) after correction. In addition, Equation (2) can be modified as Equation (3).

$$Y = a\Delta X + b \quad \ldots \quad (1)$$

$$Y = (a + 2^e)\Delta X + b \quad (2)$$

$$Y = a\Delta X + (2^e \Delta X + b) \quad \ldots \quad (3)$$

From Equation (3), correction by adding correction value $2^e$ to the inclination a is considered to be the same as correction by adding correction value $2^e \Delta X$ to the initial value b. The correction value $2^e \Delta X$ is the product of the offset value $\Delta X$ and the correction value $2^e$ of the inclination a. In addition, if the inclination a is represented in a binary format, the product can be calculated by shifting the value of the inclination a by e digits of the power e.

The actual calculation is carried out as follows. To begin with, the high-order m bits U are input to the LUT101, the LUT102, and the LUT103, and the initial value b, the inclination a, and the correction shift amount e corresponding to the high-order m bits U are output therefrom, respectively.

At the same time, the low-order (n-m) bits D of the input operand X are input to the offset circuit 9, and the offset $\Delta X$ from the midpoint M is then output therefrom.

In addition, the most significant bit Xm-n of the low-order (n-m) bits D in the input operand X is input to the determination circuit 13 simultaneously. Whether or not the region needs correction is determined through observation of the low-order (n-m) bits D, and a correction signal is output in accordance with the determination results.

The selector 16 selects one of the offset $\Delta X$ of the offset circuit 9, an inverted value of the offset $\Delta X$ inverted by the inverter 22, and 0 (zero) in conformity with the correction signal.

The shifter 21 shifts the selected offset $\Delta X$, the inverted value of the offset $\Delta X$, or 0 (zero) by the correction shift amount e. This allows determination of the absolute correction amount.

The adder-subtracter 15 adds the selected offset $\Delta X$, an inverted value of the offset $\Delta X$, or 0 (zero) to the initial value b or subtracts the selected offset $\Delta X$, an inverted value of the offset $\Delta X$, or 0 (zero) from the initial value b, and then outputs the resulting value.

The multiplier 10 multiplies the inclination a by the offset $\Delta X$ and then outputs the resulting product concurrently with that addition or subtraction.

The adder 11 adds the output from the adder-subtracter 15 and the output from the multiplier 10. This provides a function approximation as the final result.

According to the fourth embodiment, the approximation accuracy may be improved without considerable increase in either the number of entries in the LUT0 and in the calculation time.

According to the fourth embodiment, a function approximation arithmetic unit, which decreases the error between a function and a corresponding straight line without an exponential increase in LUT size, can be provided.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. An arithmetic unit for approximating a function, comprising:
    a look-up table including a circuit configured to be connected to a register and output an initial value, an inclination of a straight line and at least one of relative correction values for the initial value and the inclination in response to an entry of a high-order bit string, an operand from the register being divided into the high-order bit string and a low-order bit string, a domain of the function of the operand being divided into a plurality of segments associated with the high-order bit string, the function being approximated by the straight line indicating a value equal to the initial value at a reference value in one of the segments;
    an offset circuit configured to calculate an offset of the low-order bit string from the reference value;
    a determination circuit configured to determine whether a correction of the straight line is necessary by using high-order bits in the low-order bit string;
    a correction circuit configured to output the inclination obtained by adding an absolute correction value based on the relative correction values to at least one of the initial value and the inclination or by subtracting the absolute correction value from at least one of the initial value and the inclination, when the correction is necessary;
    a multiplier configured to calculate a product of the inclination and the offset; and
    an adder configured to calculate the sum of the initial value and the product and output the sum to the register,
    wherein the correction circuit comprises:
    an adder-subtractor configured to output a corrected inclination obtained by adding the absolute correction value to the inclination or subtracting the absolute correction value from the inclination; and
    a selector configured to select the corrected inclination when correction is necessary, whereby the size of the look-up table circuit is kept small.

2. The arithmetic unit of claim 1, wherein the look-up table comprises:
    an initial value look-up table associated with the high-order bit string and configured to output the initial value;
    an inclination look-up table associated with the high-order bit string and configured to output the inclination; and
    a first correction look-up table associated with the high-order bit string and configured to output the relative correction value of one of the initial value and the inclination.

3. The arithmetic unit of claim 2, wherein the first correction look-up table outputs a relative correction value associated with only a part of the high-order bits in the high-order bit string.

4. The arithmetic unit of claim 2, wherein the look-up table further comprises a second correction look-up table associated with the high-order bit string and configured to output the relative correction value of the other one of the initial value and the inclination.

5. The arithmetic unit of claim 1, wherein the correction circuit comprises:
    an adder-subtractor configured to output a corrected initial value obtained by adding the absolute correction value to the initial value or subtracting the absolute correction value from the initial value; and
    a selector configured to select the corrected initial value when correction is necessary.

6. The arithmetic unit of claim 5, wherein the determination circuit comprises an addition-subtraction determination circuit determining whether the adder-subtractor adds or subtracts the absolute correction value by using the high-order bits.

7. The arithmetic unit of claim 1, wherein the reference value corresponds to the center of the one of the segments, the segment being divided by the reference value into halves, and the determination circuit determines that correction is necessary only when the most significant bit of the high-order bits corresponds to one of the divided halves.

8. The arithmetic unit of claim 1, wherein the segment is divided into a plurality of regions corresponding to the high-order bits, and the determination circuit determines whether correction for each region is necessary.

9. The arithmetic unit of claim 8, wherein the correction circuit comprises an addition-subtraction determination circuit determining whether to add or subtract the absolute correction value to or from the initial value by using the high-order bits.

10. The arithmetic unit of claim 9, wherein the addition-subtraction determination circuit determines whether either addition or subtraction is carried out by using an inverted value of a value obtained by an exclusive OR operation of the most significant bit and the second high-order bit of the high-order bits.

11. The arithmetic unit of claim 8, wherein the determination circuit determines whether correction is necessary by using an inverted value of a value obtained by an exclusive OR operation of an upper second bit and the upper third bit of the high-order bits.

12. An arithmetic unit for approximating a function, comprising:
a look-up table including a circuit configured to be connected to a register and output an initial value, an inclination of a straight line and a relative correction value for the initial value in response to an entry of a high-order bit string, an operand from the register being divided into the high-order bit string and a low-order bit string, a domain of the function of the operand being divided into a plurality of segments associated with the high-order bit string, the function being approximated by the straight line indicating a value equal to the initial value at a reference value in one of the segments;
an offset circuit configured to calculate an offset of the low-order bit string from the reference value;
a determination circuit configured to determine whether a correction of the straight line is necessary by using the high-order bits in the low-order bit string;
a correction circuit configured to output the inclination obtained by adding an absolute correction value based on the relative correction values to the initial value or by subtracting the absolute correction value from the initial value, when the correction is necessary;
a multiplier configured to calculate a product of the inclination and the offset; and
an adder configured to calculate the sum of the initial value and the product and output the sum to the register,
wherein the absolute correction value is obtained by shifting the offset by the relative correction value as a shift amount, and
wherein the correction circuit comprises:
a shifter configured to generate the absolute correction value in conformity with the shift amount; and
an adder-subtractor configured to output a corrected initial value obtained by adding or subtracting the absolute correction value to or from the initial value, whereby the size of the look-up table circuit is kept small.

13. The arithmetic unit of claim 12, wherein the relative correction value is equal to the absolute correction value.

14. The arithmetic unit of claim 12, wherein the correction circuit further comprises a selector selecting one of the offset, an inverted value of the offset, and zero in conformity with the output from the determination circuit, the shifter shifts the selected offset or the inverted value of the offset in conformity with the shift amount.

15. An arithmetic unit for approximating a function, comprising:
a look-up table including a circuit configured to be connected to a register and output an initial value, an inclination of a straight line and a correction value for the inclination in response to an entry of a high-order bit string, an operand from the register being divided into the high-order bit string and a low-order bit string, a domain of the function of the operand being divided into a plurality of segments associated with the high-order bit string, the function being approximated by the straight line indicating a value equal to the initial value at a reference value in one of the segments;
an offset circuit configured to calculate an offset of the low-order bit string from the reference value;
a determination circuit configured to determine whether a correction of the straight line is necessary by using high-order bits in the low-order bit string;
a correction circuit configured to output the inclination obtained by adding the correction value to the inclination or by subtracting the correction value from the inclination, when the correction is necessary;
a multiplier calculating a product of the inclination and the offset; and
an adder calculating the sum of the initial value and the product and output the sum to the register,
wherein the correction circuit comprises:
an adder-subtractor configured to output a corrected inclination obtained by adding the correction value to the inclination or subtracting the correction value from the inclination; and
a selector configured to select the corrected inclination when correction is necessary, whereby the size of the look-up table circuit is kept small.

* * * * *